(12) United States Patent
Asano

(10) Patent No.: US 12,253,433 B2
(45) Date of Patent: Mar. 18, 2025

(54) GAS MONITORING DEVICE, METHOD, AND PROGRAM

(71) Applicant: KONICA MINOLTA, INC., Tokyo (JP)

(72) Inventor: Motohiro Asano, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 370 days.

(21) Appl. No.: 17/618,408

(22) PCT Filed: Dec. 12, 2019

(86) PCT No.: PCT/JP2019/048710
§ 371 (c)(1),
(2) Date: Dec. 10, 2021

(87) PCT Pub. No.: WO2020/250461
PCT Pub. Date: Dec. 17, 2020

(65) Prior Publication Data
US 2022/0291069 A1    Sep. 15, 2022

(30) Foreign Application Priority Data
Jun. 11, 2019   (JP) .................................. 2019-108534

(51) Int. Cl.
*G01M 3/04*    (2006.01)
*G06T 7/00*    (2017.01)
(Continued)

(52) U.S. Cl.
CPC ............. *G01M 3/04* (2013.01); *G06T 7/0008* (2013.01); *G08B 21/12* (2013.01); *G08B 25/00* (2013.01);
(Continued)

(58) Field of Classification Search
CPC ....... G01M 3/04; G01M 3/002; G06T 7/0008; G06T 2207/10048; G06T 2207/30108; G08B 21/12; G08B 25/00
See application file for complete search history.

(56) References Cited

U.S. PATENT DOCUMENTS 10,145,788 B2    12/2018   Asano et al.
10,520,429 B2    12/2019   Asano et al.
(Continued)

FOREIGN PATENT DOCUMENTS

JP    2000101987 A    4/2000
JP       6245418 B2   11/2017
(Continued)

OTHER PUBLICATIONS

Translation of Written Opinion dated Mar. 3, 2020, issued in International Application No. PCT/JP2019/048710.
(Continued)

*Primary Examiner* — Suman K Nath
(74) *Attorney, Agent, or Firm* — Holtz, Holtz & Volek PC

(57) ABSTRACT

A gas monitoring device, a gas monitoring method, and a gas monitoring program detect presence or absence of a predetermined gas on the basis of an image obtained by imaging a monitoring target, receive an input of predetermined additional information including alarm activation presence/absence information representing whether or not to activate an alarm, and determine whether or not to suppress alarm activation of presence of gas detected in the detection on the basis of the additional information received.

18 Claims, 17 Drawing Sheets

(51) Int. Cl.
    *G08B 21/12*    (2006.01)
    *G08B 25/00*    (2006.01)
(52) U.S. Cl.
    CPC .............. *G06T 2207/10048* (2013.01); *G06T 2207/30108* (2013.01)

(56) References Cited

U.S. PATENT DOCUMENTS

| | | | |
|---|---|---|---|
| 2006/0220888 A1 | 10/2006 | Germouni et al. | |
| 2008/0092625 A1* | 4/2008 | Hinnrichs | G01J 3/02 73/23.2 |
| 2019/0113414 A1 | 4/2019 | Tsuzuki et al. | |
| 2020/0209095 A1* | 7/2020 | Swissa | G01N 27/048 |

FOREIGN PATENT DOCUMENTS

| | | |
|---|---|---|
| WO | 2014176693 A1 | 11/2014 |
| WO | 2018110036 A1 | 6/2018 |
| WO | 2019021283 A1 | 1/2019 |
| WO | 2019044898 A1 | 3/2019 |

OTHER PUBLICATIONS

International Search Report (ISR) (and English language translation thereof) dated Mar. 3, 2020, issued in International Application No. PCT/JP2019/048710.
Written Opinion dated Mar. 3, 2020, issued in International Application No. PCT/JP2019/048710.
Extended European Search Report (EESR) dated Jun. 20, 2022, issued in counterpart European Application No. 19932817.0.

* cited by examiner

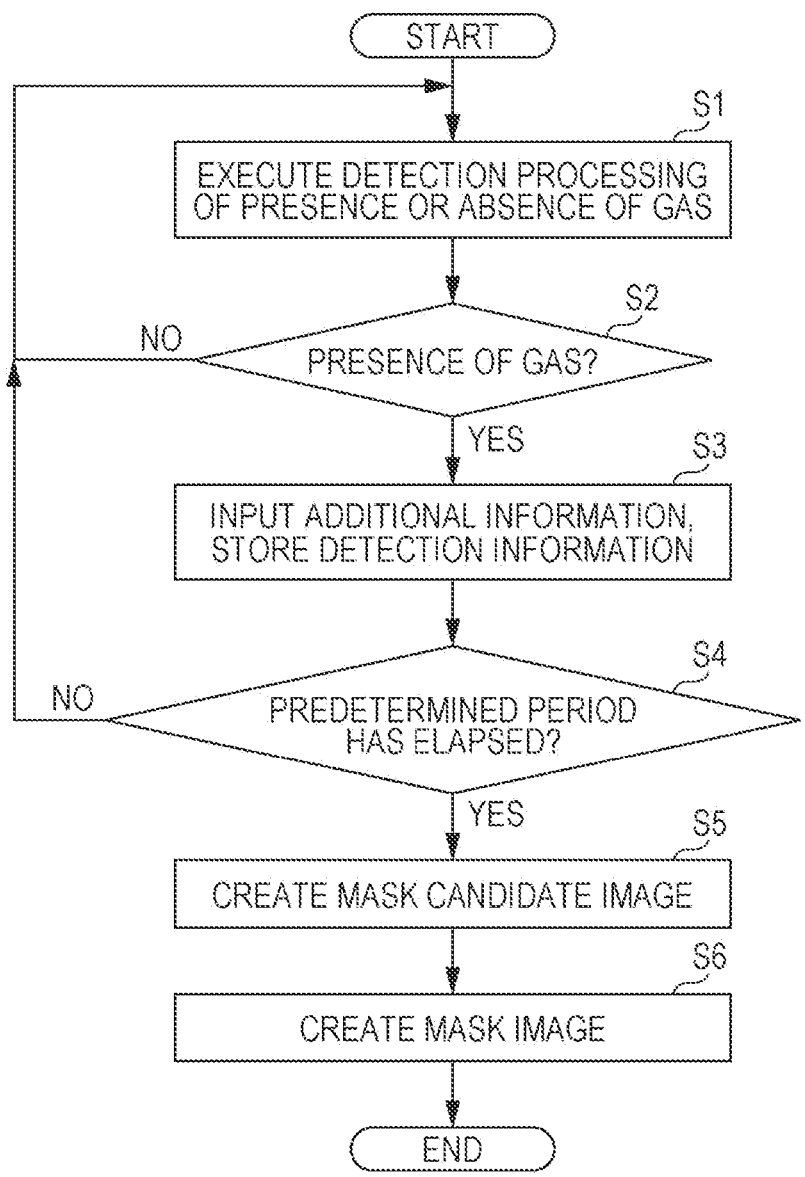

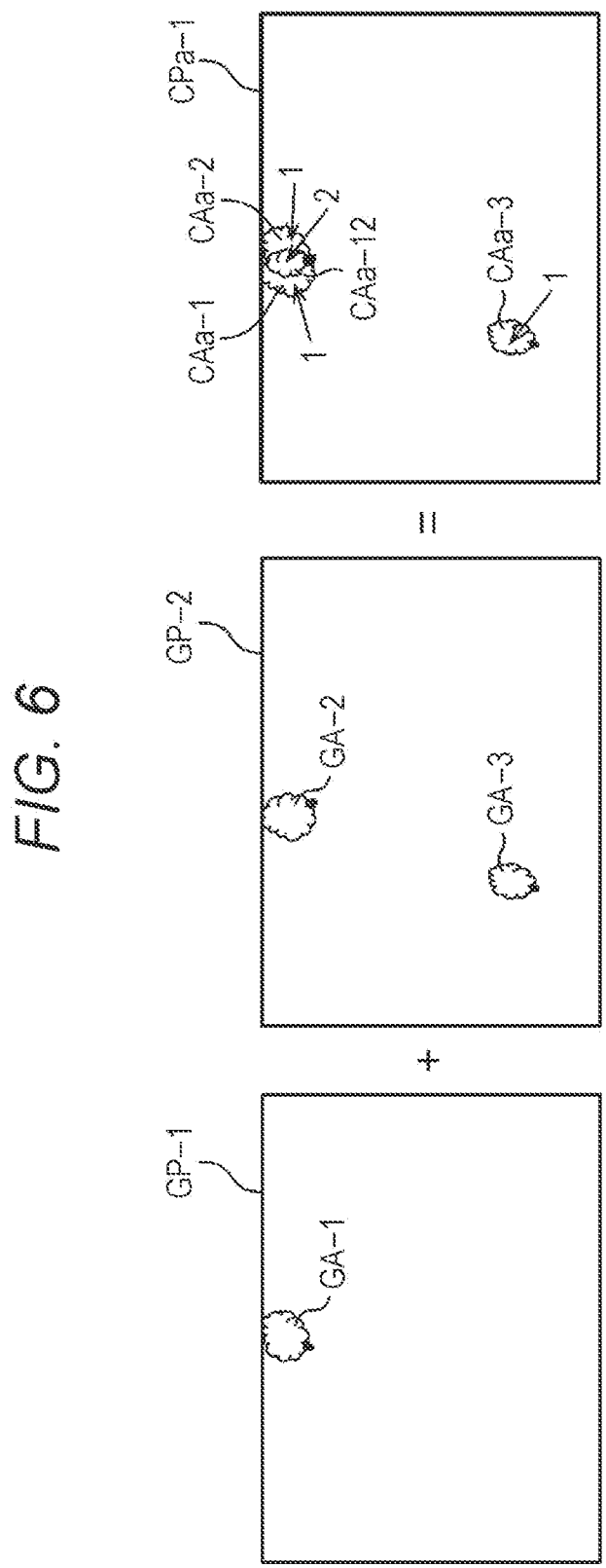

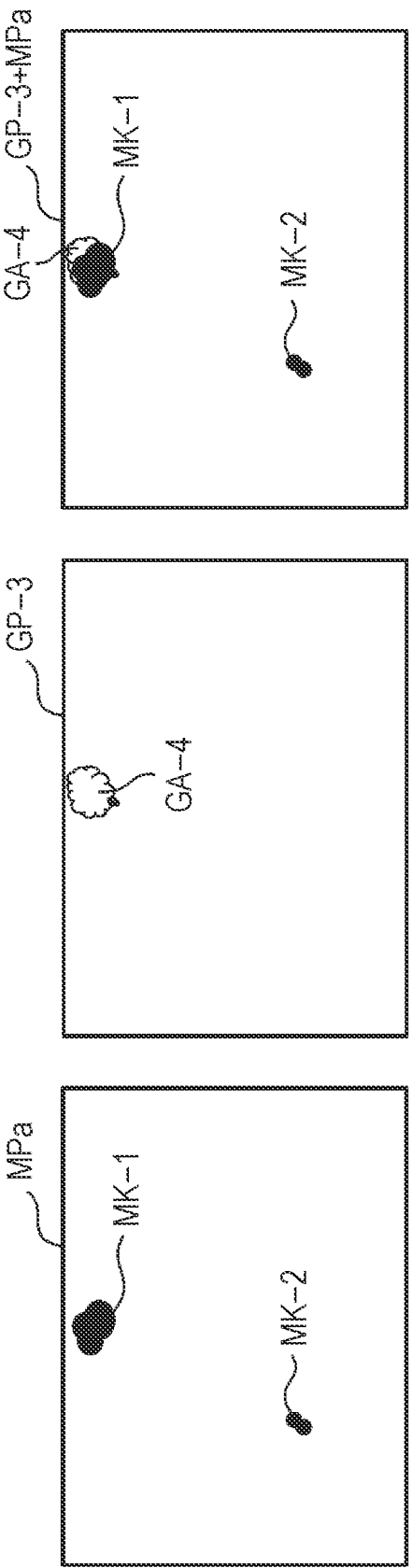

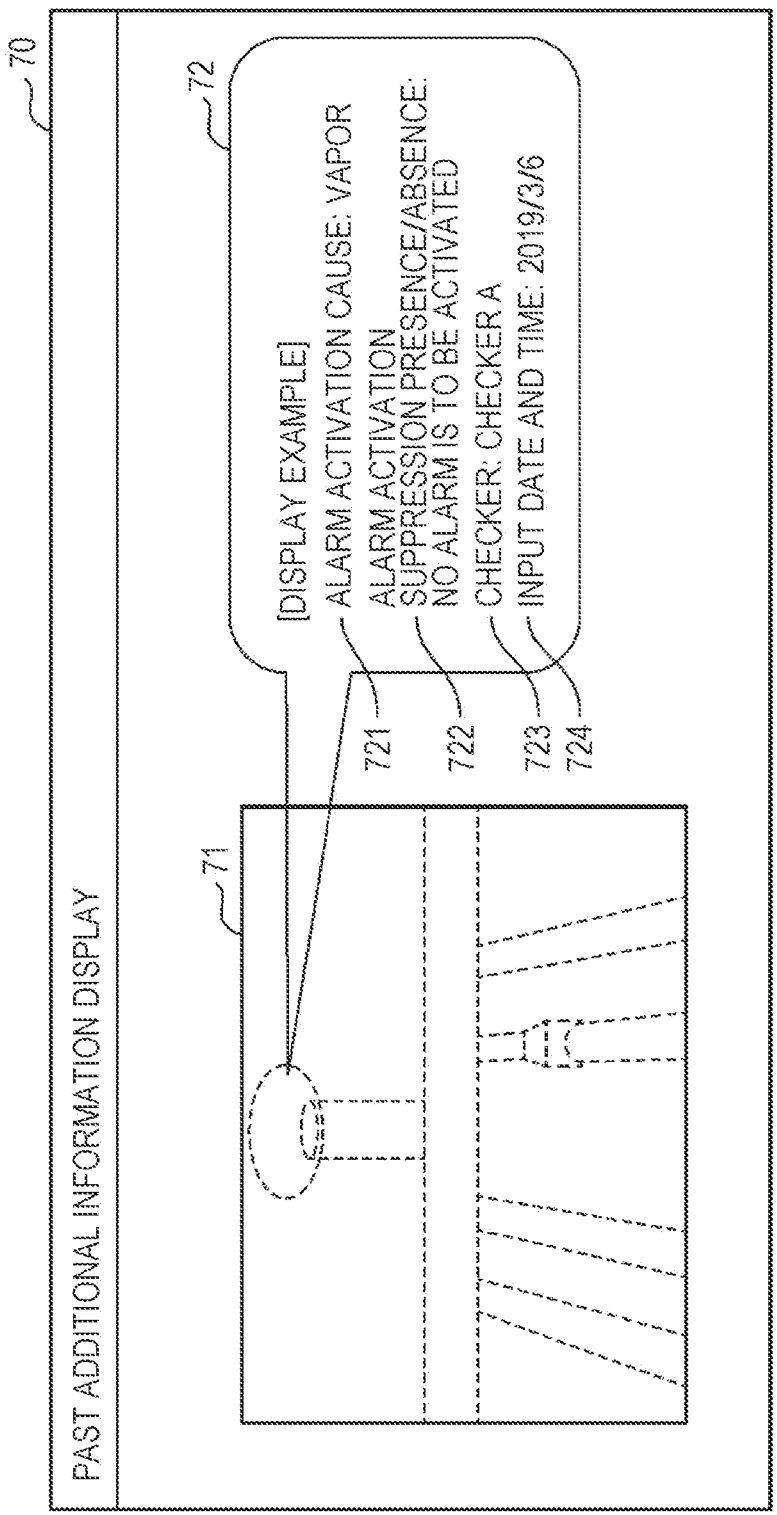

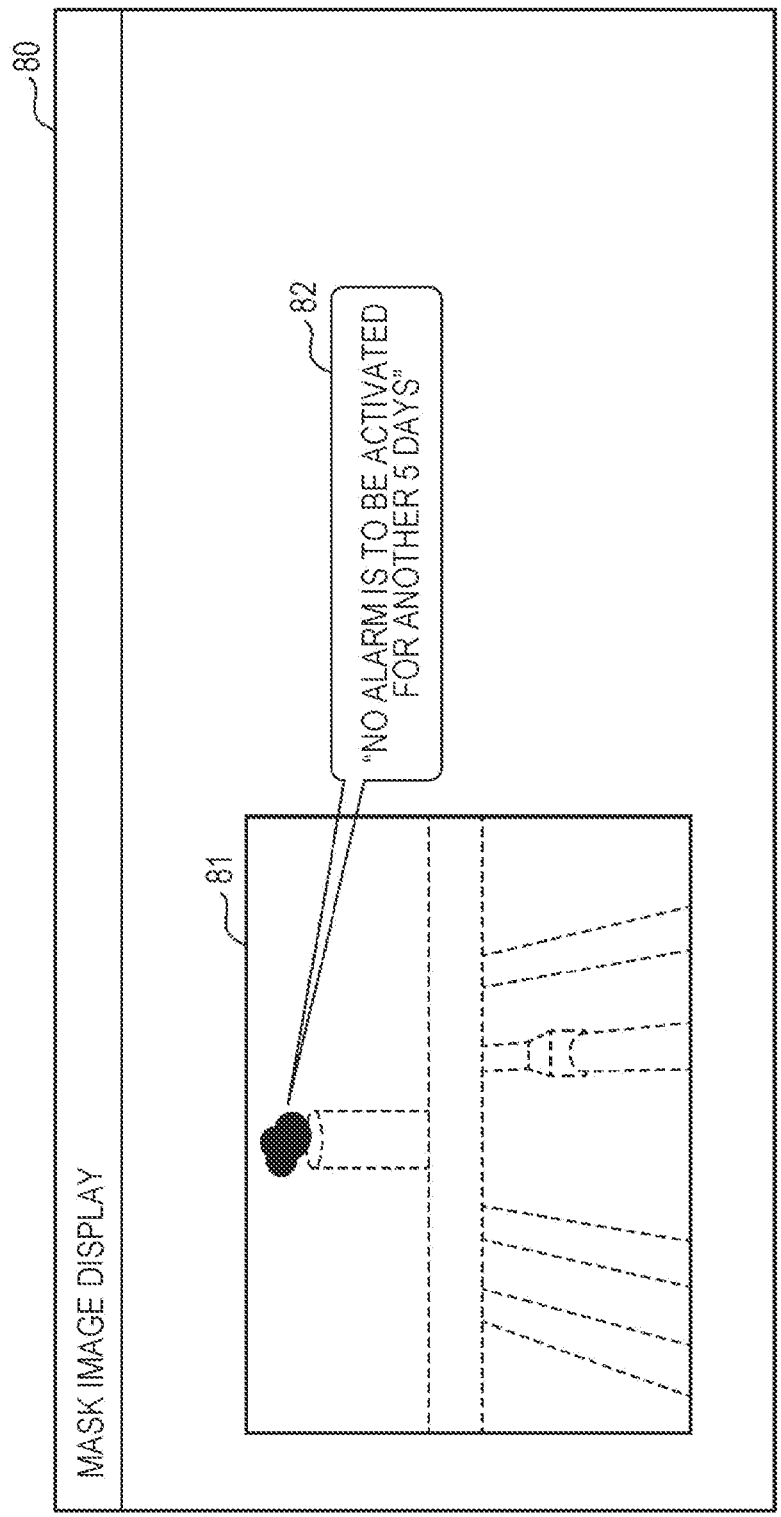

*FIG. 13A*
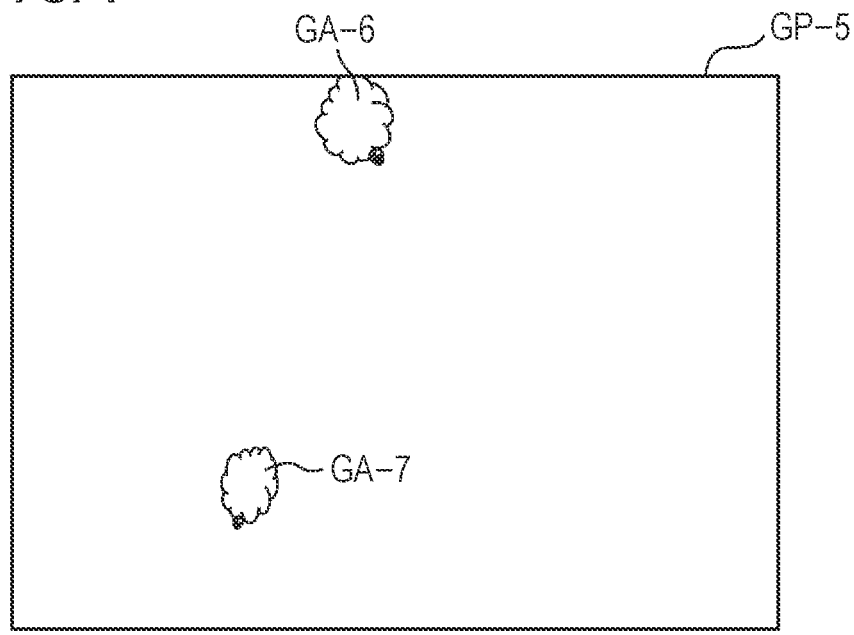
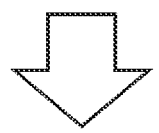 CENTROID POSITION CALCULATION
*FIG. 13B*
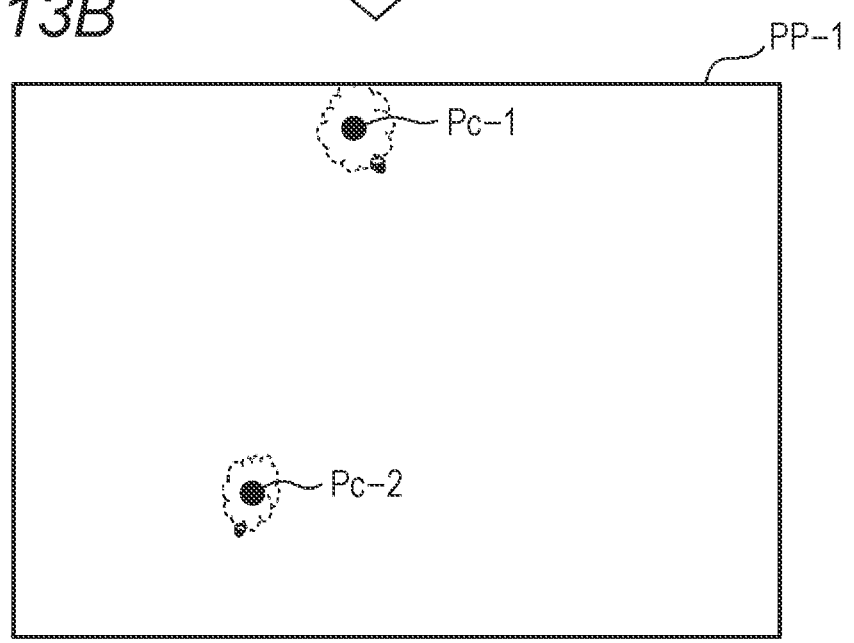

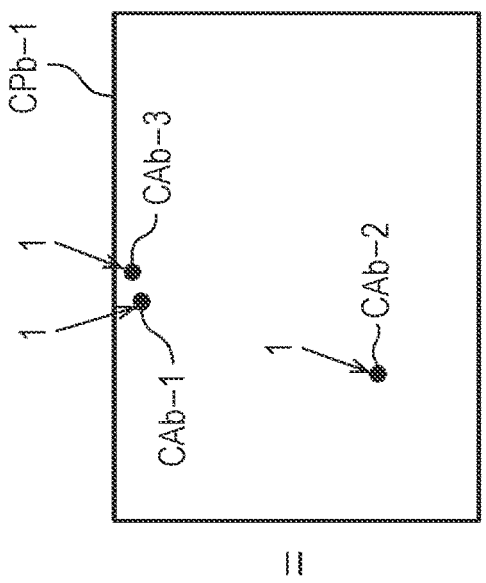
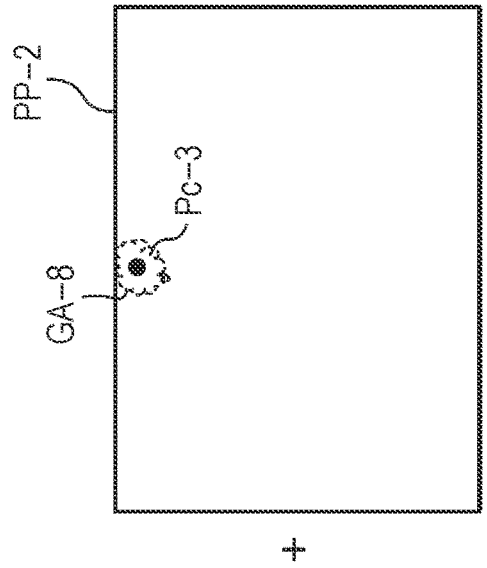
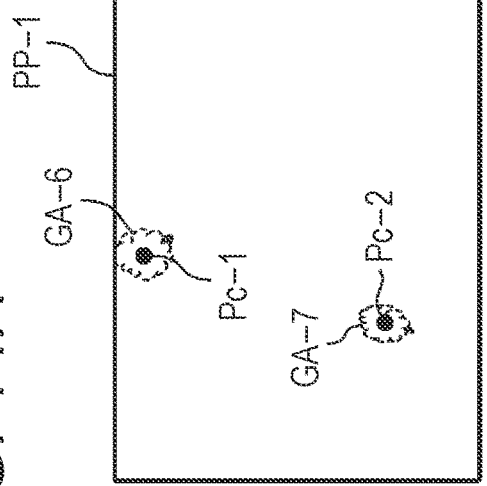
FIG. 14A
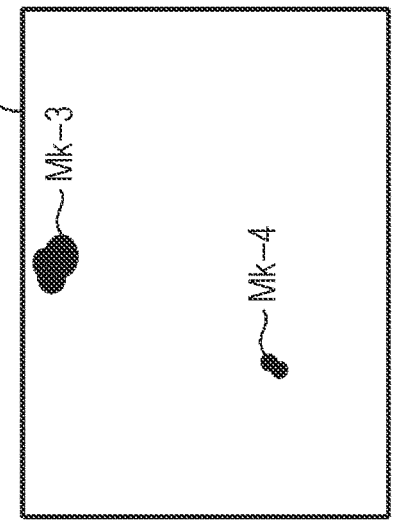
FIG. 14B

FIG. 15A — MPb, MK-3, MK-4

FIG. 15B — GP-3, GA-4

FIG. 15C — GP-3+MPb, Pc-4, MK-3, MK-4

FIG. 15D — GP-4, GA-5

FIG. 15E — GP-4+MPb, Pc-5, MK-3, MK-4

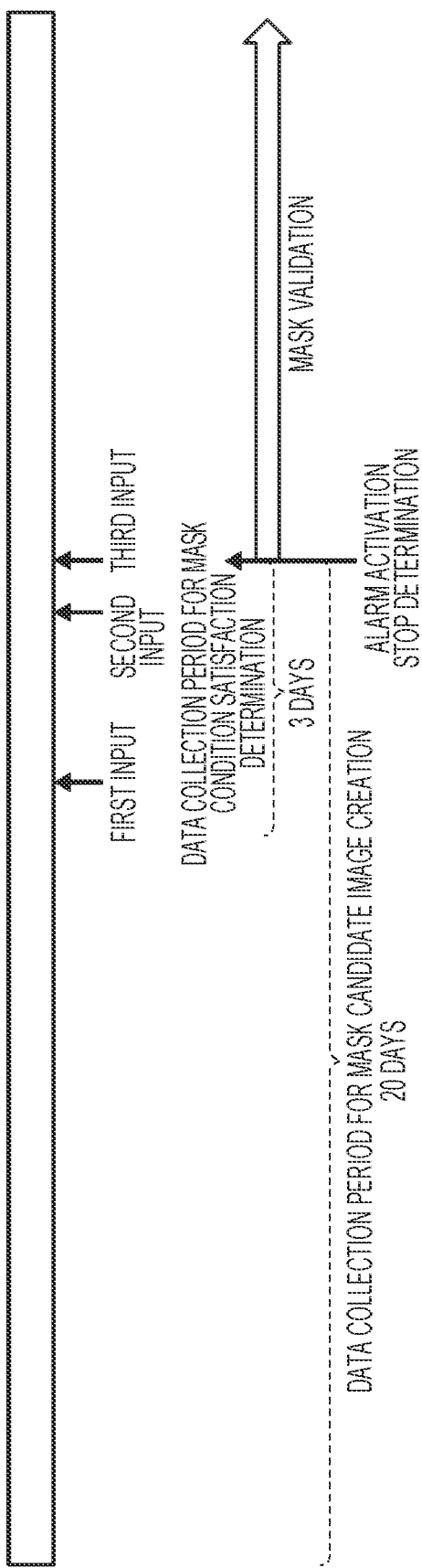
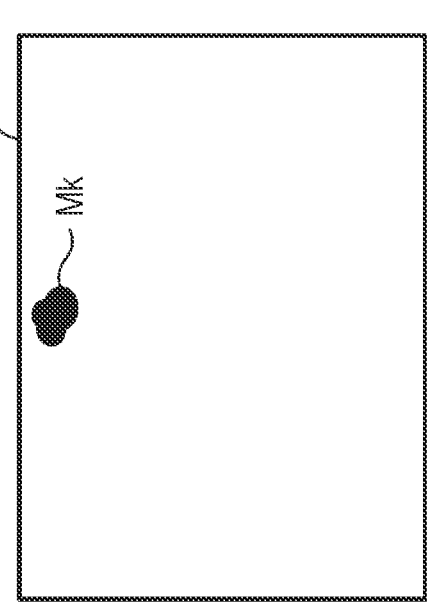
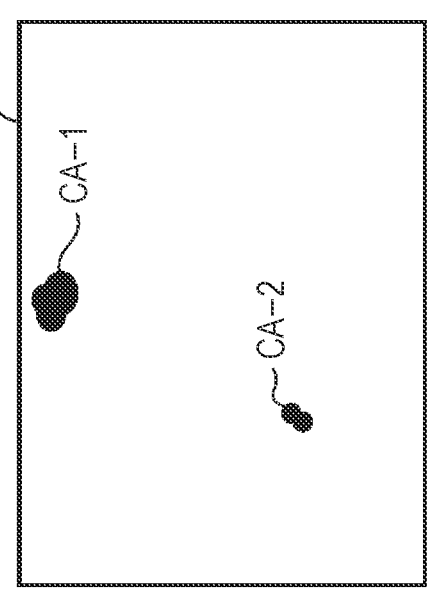

GAS MONITORING DEVICE, METHOD, AND PROGRAM

TECHNICAL FIELD

The present invention relates to a gas monitoring device, a gas monitoring method, and a gas monitoring program that monitor the presence or absence of a predetermined gas in a space.

BACKGROUND ART

To monitor the presence or absence of a predetermined gas in a space, a gas detection device can be used that detects the predetermined gas present in the space. The gas detection device is disclosed in, for example, Patent Literature 1. A gas-detection image-processing device disclosed in Patent Literature 1 is a device that performs image processing on infrared images obtained by capturing an image of a gas leakage monitoring target at a plurality of times, and includes an image processing unit that performs processing of removing second frequency component data that has a frequency lower than that of first frequency component data indicating a temperature change due to a leaked gas and indicates a temperature change of a background of the monitoring target, from image data indicating the infrared images.

Since a temperature change due to absorption of infrared rays is used for detection of gas, glitter due to reflection of sunlight may be erroneously detected as temperature fluctuation due to gas, or an object reflecting a heat source may be erroneously detected as gas. In addition, a plant has equipment for releasing water vapor subjected to heat exchange, and there is a case where the released water vapor or steam is erroneously detected as gas.

In a case where predetermined work such as removal and leakage countermeasures of gas is performed when the gas is detected by gas monitoring, if gas detection is a false alarm, predetermined action for performing the predetermined work is wasted, for example, preparation for performing the predetermined work, movement toward a place where the gas is detected, or the like.

CITATION LIST

Patent Literature

Patent Literature 1: JP 6245418 B2 (WO 2017/073430 A)

SUMMARY OF INVENTION

The present invention has been made in view of the above-described circumstances, and an object thereof is to provide a gas monitoring device, a gas monitoring method, and a gas monitoring program capable of reducing false alarms.

To achieve the above-described object, a gas monitoring device, a gas monitoring method, and a gas monitoring program reflecting one aspect of the present invention detects presence or absence of a predetermined gas on the basis of an image obtained by imaging a monitoring target, receives an input of predetermined additional information including alarm activation presence/absence information representing whether or not to activate an alarm, and determines whether or not to suppress alarm activation of presence of gas detected in the detection on the basis of the additional information received.

Advantages and features provided by one or a plurality of embodiments of the invention will be fully understood from the detailed description provided below and the accompanying drawings. These detailed description and accompanying drawings are given by way of example only and are not intended as a definition of the limits of the present invention.

BRIEF DESCRIPTION OF DRAWINGS

FIG. 2 is a flowchart illustrating operation of the gas monitoring device.

FIG. 6 is a diagram for explaining a generation process of a mask candidate image performed by the gas monitoring device.

FIGS. 9A-9E are diagrams for explaining an alarm activation process of gas detection using the mask image.

FIG. 10 is a diagram for explaining a past additional information display screen displayed on the gas monitoring device, as an example, in a first modification.

FIG. 11 is a diagram for explaining a mask image display screen displayed on the gas monitoring device, as an example, in a second modification.

FIGS. 13A and 13B are diagrams for explaining a centroid position of a gas area in a fourth modification.

FIGS. 14A and 14B are diagrams for explaining each generation process of a mask candidate image and a mask image in the fourth modification.

FIGS. 15A-15E are diagrams for explaining an alarm activation process of gas detection using the mask image in the fourth modification.

FIGS. 16A-16C are a time chart for explaining each generation process of a mask candidate image and a mask image in a fifth modification.

DESCRIPTION OF EMBODIMENTS

Figure 1:
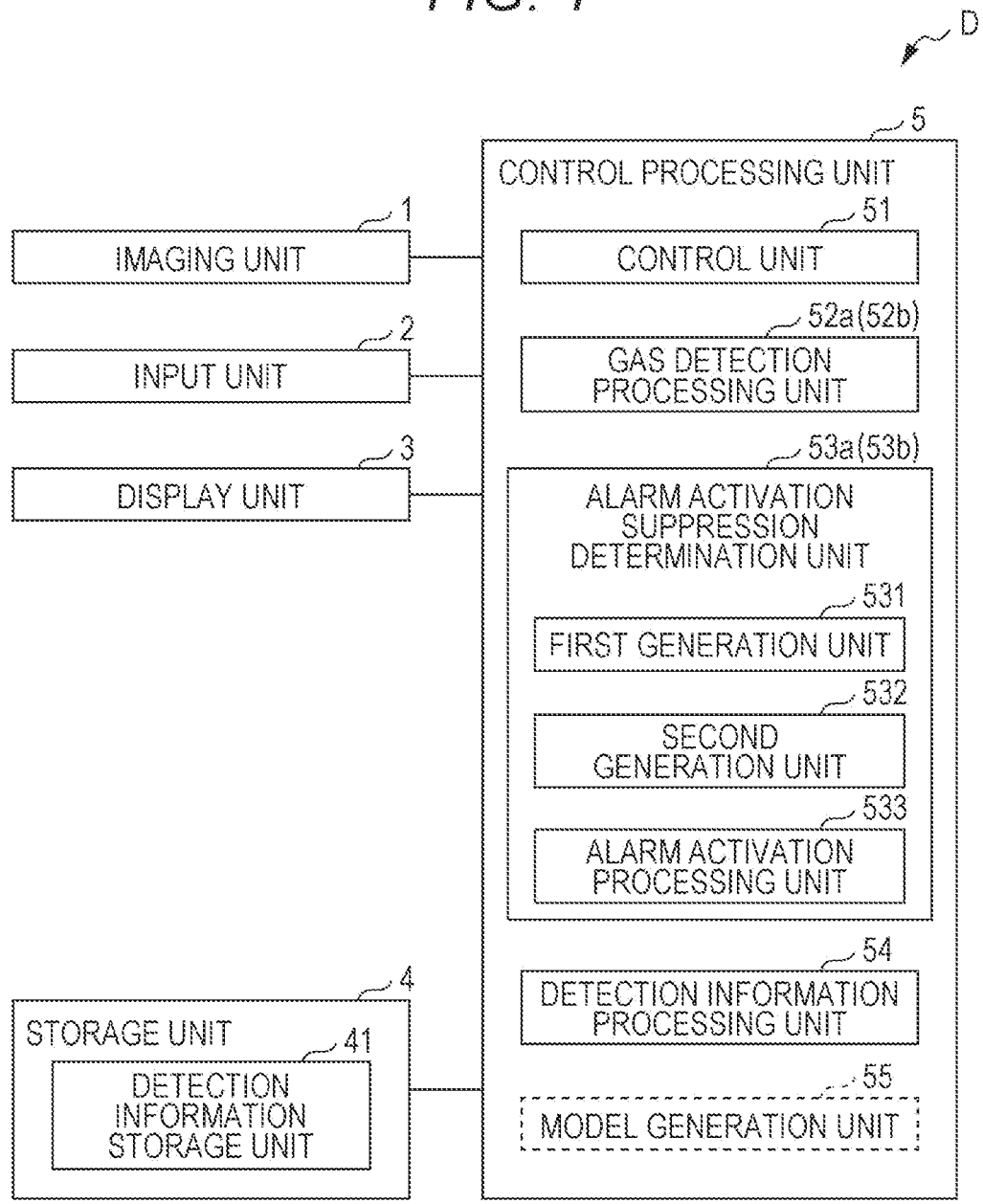
FIG. 1 is a block diagram illustrating a configuration of a gas monitoring device in an embodiment.

Hereinafter, one or a plurality of embodiments of the present invention will be described with reference to the drawings. However, the scope of the invention is not limited to the disclosed embodiments. Note that, it is indicated that components denoted by the same reference numerals in the respective figures are the same components, and the description thereof will be omitted as appropriate. In the present specification, components collectively referred to are denoted by a reference numeral with a suffix omitted, and an individual component is denoted by a reference numeral with a suffix.

A gas monitoring device in an embodiment is a device that monitors the presence or absence of gas in a monitoring target and, in a case where the presence of gas is detected, activates an alarm of the presence of gas to the outside. The monitoring target is, for example, a storage facility that stores a predetermined gas, a utilization facility that uses a predetermined gas (for example, a gas power plant or a gas processing plant, and the like), a supply and distribution facility that supplies and distributes a predetermined gas, and the like. In the present embodiment, to reduce false alarms, such a gas monitoring device includes: a gas detection unit that detects presence or absence of a predetermined gas on the basis of an image obtained by imaging the monitoring target; an input unit that receives an input of predetermined additional information including alarm activation presence/absence information representing whether or not to activate an alarm; and an alarm activation suppression determination unit that determines whether or not to suppress alarm activation of the presence of gas detected by the gas detection unit on the basis of the additional information received by the input unit. A more specific description will be given below.

FIG. 1 is a block diagram illustrating a configuration of a gas monitoring device in the embodiment. For example, as illustrated in FIG. 1, such a gas monitoring device D includes an imaging unit 1, an input unit 2, a display unit 3, a storage unit 4, and a control processing unit 5.

The imaging unit 1 is a device that is connected to the control processing unit 5 and captures an image of a monitoring target to generate an image (image data) of the monitoring target in accordance with control of the control processing unit 5, which is a so-called camera. The imaging unit 1 and the control processing unit 5 may be connected together by wire, wirelessly, or via a network. The imaging unit 1 outputs the generated image of the monitoring target to the control processing unit 5, and the control processing unit 5 stores the image of the monitoring target in the storage unit 4.

The imaging unit 1 images a monitoring target in an appropriate wavelength band depending on a gas detection method. For example, in a case where a method disclosed in WO 2017/073430 A (Patent Literature 1 described above) is used as the gas detection method, the imaging unit 1 is an infrared camera that images a monitoring target in an infrared wavelength band, and generates an infrared monitoring target image. Alternatively, as the gas detection method, for example, a known method can be used such as a method disclosed in JP 5343054 B2 (JP 2012 058093 A) or a method disclosed in WO 2017/073426 A.

The input unit 2 is a device that is connected to the control processing unit 5 and inputs, to the gas monitoring device D, various commands, for example, a command for giving an instruction of a start of gas monitoring, and the like, and various data necessary for monitoring a monitoring target, for example, an input of an identifier in the monitoring target, and is, for example, a plurality of input switches assigned with predetermined functions, a keyboard, a mouse, or the like. In the present embodiment, in a case where the presence of gas is detected as described later, the input unit 2 receives an input of predetermined additional information including alarm activation presence/absence information representing whether or not to activate an alarm.

The display unit 3 is a device that is connected to the control processing unit 5 and displays commands and data (including the additional information) input from the input unit 2, a mask image generated as described later, and the like in accordance with control of the control processing unit 5, and is, for example, a CRT display, a liquid crystal display (LCD), an organic EL display, or the like.

The storage unit 4 is a circuit that is connected to the control processing unit 5 and stores various predetermined programs and various predetermined data in accordance with control of the control processing unit 5. The various predetermined programs include a control processing program and the like, such as: a control program for controlling the units 1 to 4 of the gas monitoring device D depending on functions of the respective units; a gas detection processing program for detecting the presence or absence of a predetermined gas on the basis of an image obtained by imaging the monitoring target by the imaging unit 1; an alarm activation suppression determination program for determining whether or not to suppress the alarm activation of the presence of gas detected by the gas detection processing program on the basis of additional information received by the input unit 2; and a detection information processing program for receiving an input of predetermined additional information by the input unit 2 and storing, in the storage unit 4, as detection information, a detection part in which the presence of gas is detected by the gas detection processing program in the image in association with the additional information received by the input unit 2. The various types of predetermined data include, for example, data and the like necessary for executing each program, such as an image captured by the imaging unit 1, a gas detection image, a mask candidate image, and a mask image. The storage unit 4 includes, for example, a read only memory (ROM) that is a nonvolatile storage element, an electrically erasable programmable read only memory (EEPROM) that is a rewritable nonvolatile storage element, and the like. The storage unit 4 includes a random access memory (RAM) serving as a so-called working memory of the control processing unit 5 that stores data and the like generated during execution of the predetermined programs. Note that, the storage unit 4 may include a hard disk device having a relatively large storage capacity. In the present embodiment, the storage unit 4 functionally includes a detection information storage unit 41.

The detection information storage unit 41 stores the detection information. For example, in the present embodiment, the detection information storage unit 41 stores, as the detection information, the detection part in which the presence of gas is detected by a gas detection processing unit 52a described later in the image in association with the additional information received by the input unit 2. The additional information includes alarm activation presence/absence information representing whether or not to activate an alarm. In the present embodiment, the additional information further includes cause information representing a cause of detection of presence of gas by the gas detection processing unit 52a, checker information representing a checker who has input the additional information from the input unit 2, and input date and time information representing date and time when the additional information has been input from the input unit 2. The alarm activation presence/absence information includes alarm activation presence information representing that an alarm is to be activated and alarm activation absence information representing that no alarm is to be activated. The cause information includes, for example, vapor that may be erroneously detected as gas, a shadow of vapor, unknown cause, and the like. The checker information is, for example, a name of a checker, an identifier (checker ID) for specifying and identifying the checker, or the like.

The control processing unit 5 is a circuit that controls the units 1 to 4 of the gas monitoring device D depending on the functions of the respective units, monitors the presence or absence of gas in the monitoring target, and in a case where the presence of gas is detected, activates an alarm of the presence of gas on the basis of whether or not to suppress the alarm activation determined on the basis of the additional information received by the input unit 2. The control processing unit 5 includes, for example, a central processing unit (CPU) and its peripheral circuits. The control processing program is executed, whereby the control processing unit 5 functionally includes a control unit 51, the gas detection processing unit 52*a*, an alarm activation suppression determination unit 53*a*, and a detection information processing unit 54.

The control unit 51 controls the units 1 to 4 of the gas monitoring device D depending on the functions of the respective units, and controls the entire gas monitoring device D.

The gas detection processing unit 52*a* detects the presence or absence of a predetermined gas on the basis of an image obtained by imaging the monitoring target by the imaging unit 1. In the present embodiment, the gas detection processing unit 52*a* generates a gas detection image representing the presence or absence of gas for each pixel by a known gas detection method. In the present embodiment, as described above, the method disclosed in WO 2017/073430 A (Patent Literature 1 described above) is used. The device disclosed in Patent Literature 1 first executes processing of removing second frequency component data that has a frequency lower than that of first frequency component data indicating a temperature change due to a leaked gas and indicates a temperature change of a background of the monitoring target, from image data indicating an infrared image. Here, the image data is moving image data having a structure in which a plurality of frames is arranged in time series, and the device sets, as time-series pixel data, data in which pixel data of pixels at the same position of the plurality of frames are arranged in time series, and performs processing of removing the second frequency component data for each of a plurality of pieces of the time-series pixel data constituting the moving image data. The device sets data extracted by performing first predetermined processing on the time-series pixel data as the second frequency component data, and extracts a plurality of pieces of the second frequency component data respectively corresponding to the plurality of pieces of time-series pixel data. The device calculates, as first difference data, data obtained by calculating a difference between the time-series pixel data and the second frequency component data extracted from the time-series pixel data, and calculates a plurality of pieces of the first difference data respectively corresponding to the plurality of pieces of time-series pixel data. The device sets, as first fluctuation data, data indicating fluctuation of the first difference data calculated by performing a predetermined operation on the first difference data in units of a second predetermined number of the frames, and calculates a plurality of pieces of the first fluctuation data respectively corresponding to the plurality of pieces of time-series pixel data. The first fluctuation data is first variation data, and the device obtains the first variation data by calculating a moving standard deviation or a moving variance of the first difference data in units of the second predetermined number of frames smaller than the plurality of frames. Then, the device detects the presence or absence of gas for each pixel by determining the first variation data with a given threshold value. For example, the presence or absence of gas is expressed by luminance, and a pixel representing the presence of gas is a white or colored pixel, and a pixel representing the absence of gas is a black pixel. The gas detection image is generated in this way.

The detection information processing unit 54 receives, by the input unit 2, an input of predetermined additional information with respect to the detection part where the presence of gas is detected by the gas detection processing unit 52*a* in the image, and stores, as the detection information, in the detection information storage unit 41 of the storage unit 4, the detection part in association with the additional information received by the input unit 2. In the present embodiment, when the gas detection processing unit 52*a* detects the presence of gas, the detection information processing unit 54 receives the input of the additional information, and stores the detection information based on the input in the storage unit 4.

The alarm activation suppression determination unit 53*a* determines whether or not to suppress the alarm activation of the presence of gas detected by the gas detection processing unit 52*a* on the basis of the additional information received by the input unit 2, for a predetermined period (including one input). When the gas detection processing unit 52*a* detects the presence of gas, in a case where the determination is suppression, the alarm activation suppression determination unit 53*a* suppresses the alarm activation of the presence of gas detected by the gas detection processing unit 52*a* and does not activates an alarm, and, on the other hand, in a case where the determination is not suppression, the alarm activation suppression determination unit 53*a* activates an alarm of the presence of gas detected by the gas detection processing unit 52*a* to the outside. As to whether or not to suppress the alarm activation of the presence of gas for the detection part in which the presence of gas is detected by the gas detection processing unit 52*a* in the image, for example, in the present embodiment, a mask image is used for suppressing the alarm activation of the presence of gas detected by the gas detection processing unit 52*a*. For this reason, in the present embodiment, the alarm activation suppression determination unit 53*a* functionally includes a first generation unit 531, a second generation unit 532, and an alarm activation processing unit 533.

The first generation unit 531 generates a mask candidate image to be a candidate for the mask image on the basis of the detection information stored in the detection information storage unit 41, for a predetermined period. The second generation unit 532 generates the mask image by setting a mask portion satisfying a predetermined mask condition as a mask, in the mask candidate image generated by the first generation unit 531. As described above, in the present embodiment, the final mask image is generated after the mask candidate image is generated. More specifically, the first generation unit 531 generates the mask candidate image by setting a detection part associated with additional information having alarm activation presence/absence information representing that no alarm is to be activated as a mask candidate portion. The predetermined mask condition is appropriately set from a plurality of samples, for example. In the present embodiment, the predetermined mask condition is that an aggregation result obtained by aggregating the alarm activation presence/absence information representing that no alarm is to be activated, for each of the detection part and the additional information, for the predetermined period is greater than or equal to a predetermined threshold value (for example, a mask determination threshold value such as twice, three times, or four times) set in advance. For this reason, in the present embodiment, during the predetermined period, after processes by the detection information processing unit 54 and the first generation unit 531 are performed, for each of the detection part and the additional information, the second generation unit 532 aggregates the alarm activation presence/absence information representing that no alarm is to be activated, compares the aggregation result with the mask determination threshold value, determines a mask candidate portion of which the aggregation result is greater than or equal to the mask determination threshold value as the mask portion, and sets the determined mask portion as the mask, thereby generating the final mask image. Such a mask portion may be permanently set as a mask until the use of the mask image is ended, but in the present embodiment, a lifetime is set, and the second generation unit 532 ends setting of the mask portion as a mask after a lapse of a predetermined fourth period (lifetime) from a time point at which the mask portion is set as a mask (that is, a time point at which it is determined to suppress the alarm activation). As a result, the alarm activation suppression determination unit 53a suppresses the alarm activation for a predetermined fourth period from the time point at which it is determined to suppress the alarm activation. Each of the predetermined period and the predetermined fourth period is appropriately set from a plurality of samples, for example. In one example, the predetermined period is set to 3 days, 5 days, 7 days, or the like, and the predetermined fourth period is set to 5 days, 7 days, 10 days, or the like.

The alarm activation processing unit 533 processes the alarm activation of a gas detection result by using the mask image. In the present embodiment, the alarm activation processing unit 533 performs the alarm activation by displaying, on the display unit 3, a gas detection image (gas detection image after mask processing) subjected to the mask processing described later on the gas detection image by using a mask image. In the present embodiment, as described later, the mask processing is processing of deleting an image detected as a gas not to activate an alarm of detection of the gas for a mask area. As a result, the alarm activation is suppressed.

The input unit 2, the display unit 3, the storage unit 4, and the control processing unit 5 in such a gas monitoring device D can be configured by, for example, a tablet computer, a notebook computer, or a desktop computer.

Note that, the imaging unit 1 and the gas detection processing unit 52a correspond to an example of the gas detection unit that detects the presence or absence of the predetermined gas on the basis of the image obtained by imaging the monitoring target.

Figure 3A:
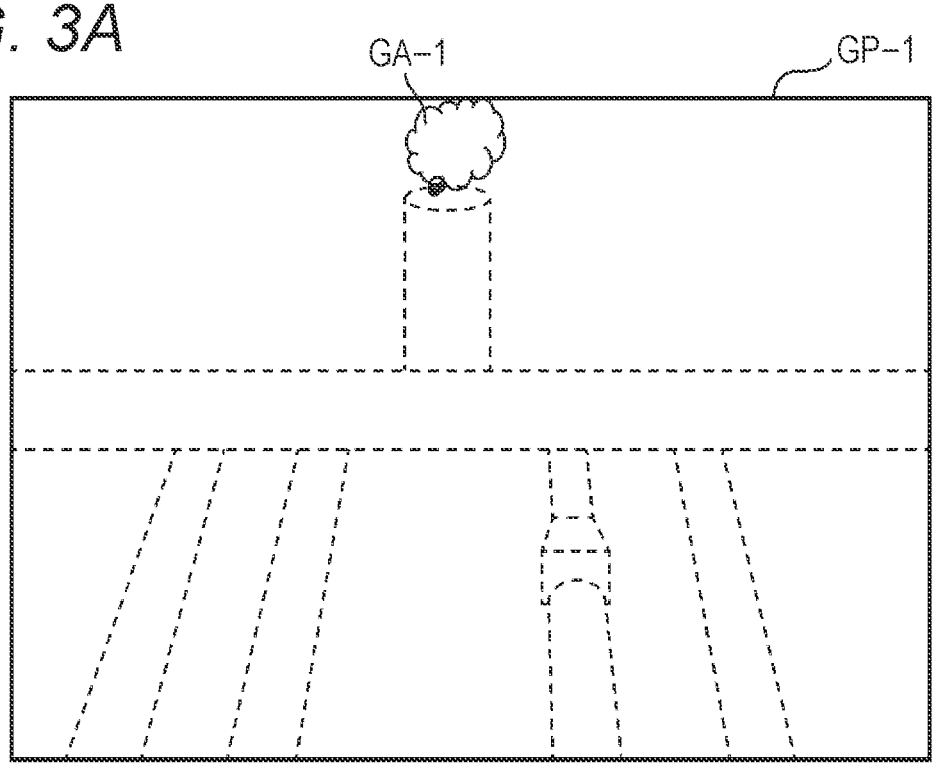
FIGS. 3A and 3B are diagrams for explaining a gas detection image of a monitoring target used in the gas monitoring device, as an example.
Figure 3B:
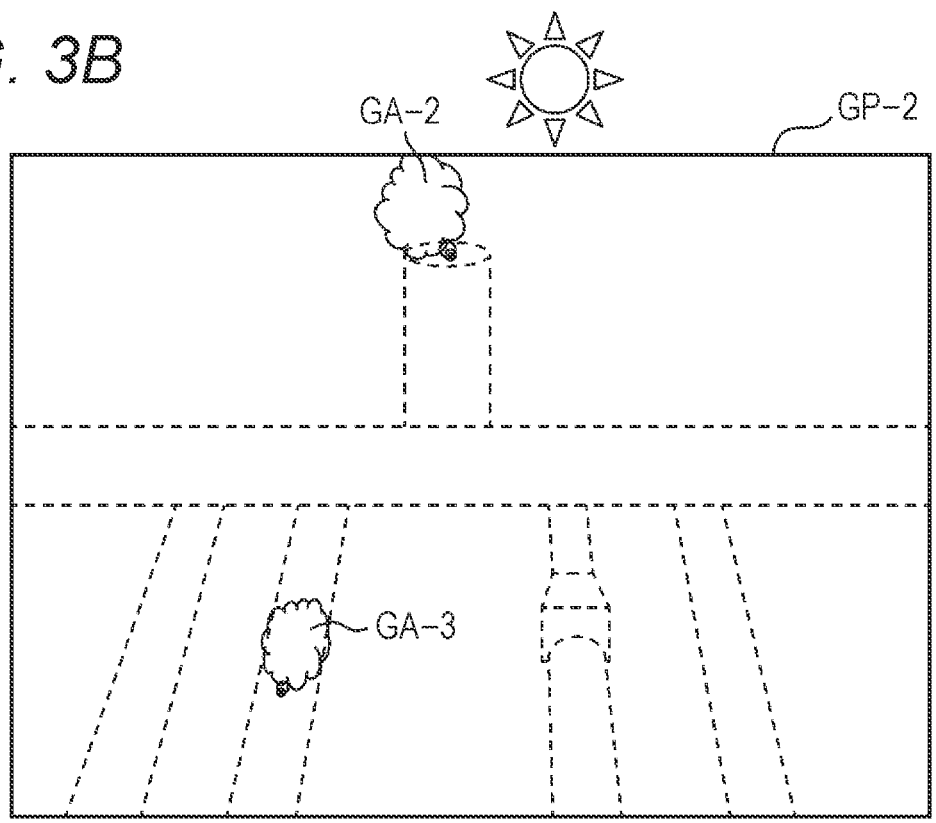
Figure 4A:
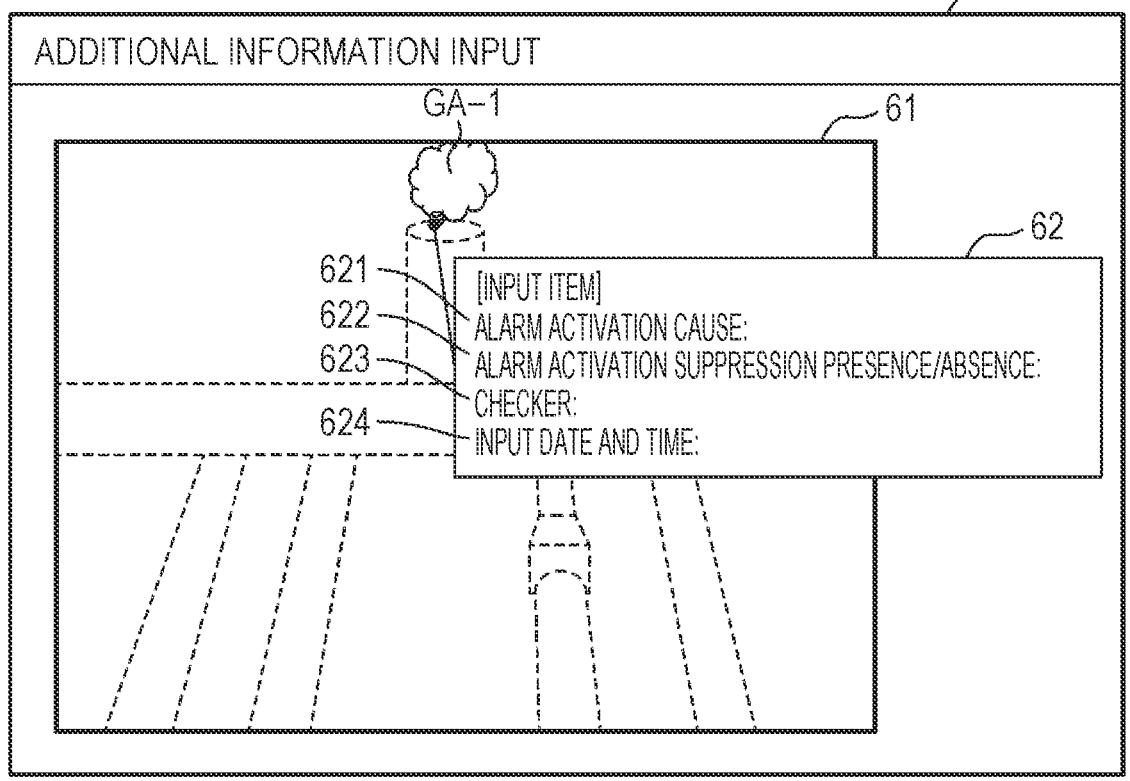
FIGS. 4A and 4B are diagrams for explaining an additional information input screen displayed on the gas monitoring device, as an example.
Figure 4B:
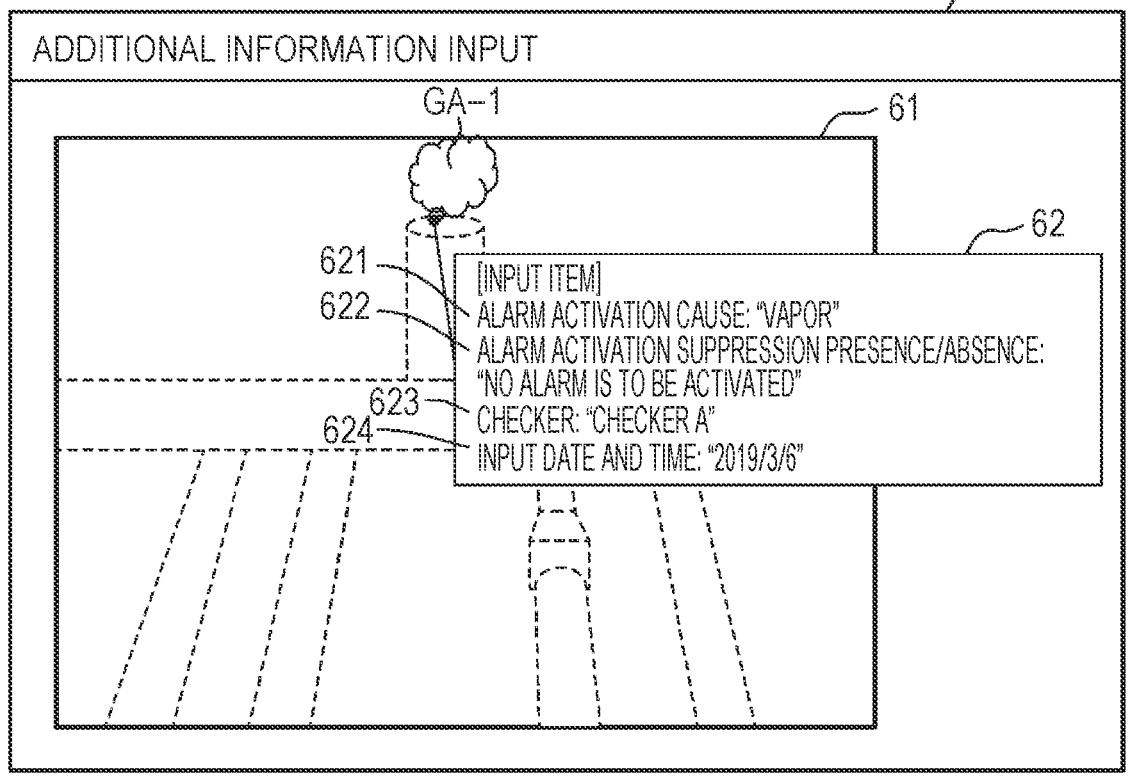
Figure 5:
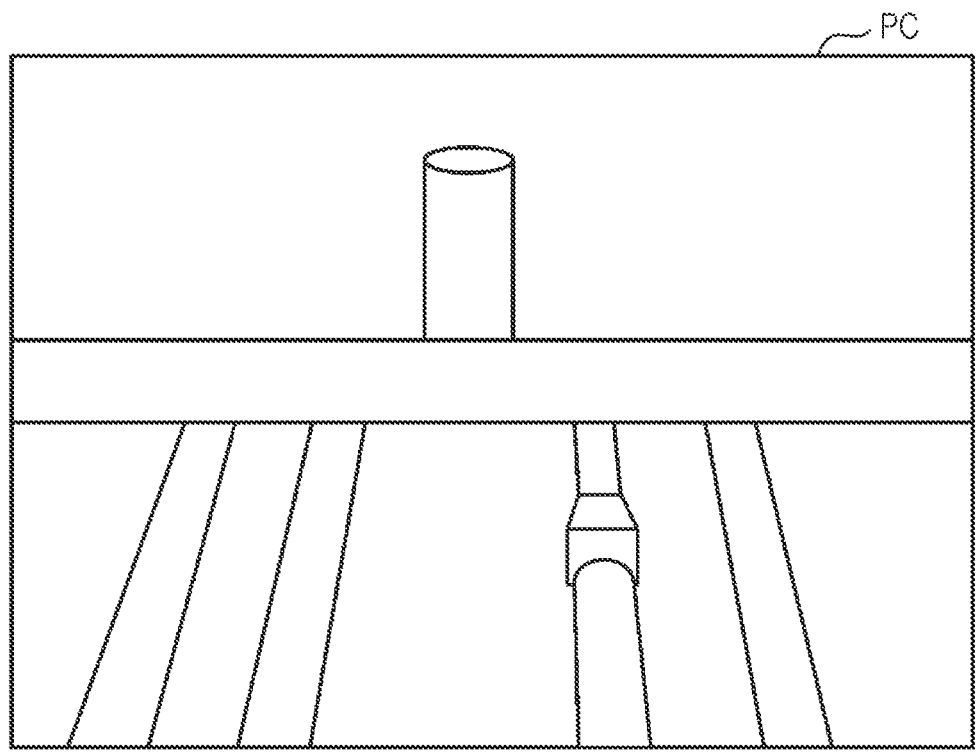
FIG. 5 is a diagram for explaining a visible image in a case where an image of the monitoring target is captured in a visible wavelength band, as an example.
Figure 7A:
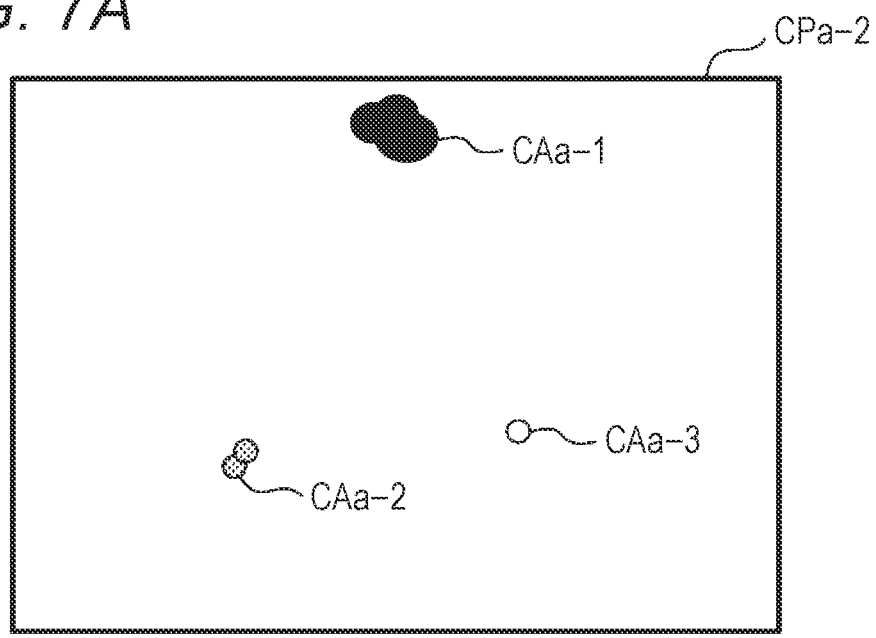
FIGS. 7A and 7B are diagrams for explaining generation process of a mask image performed by the gas monitoring device.
Figure 7B:
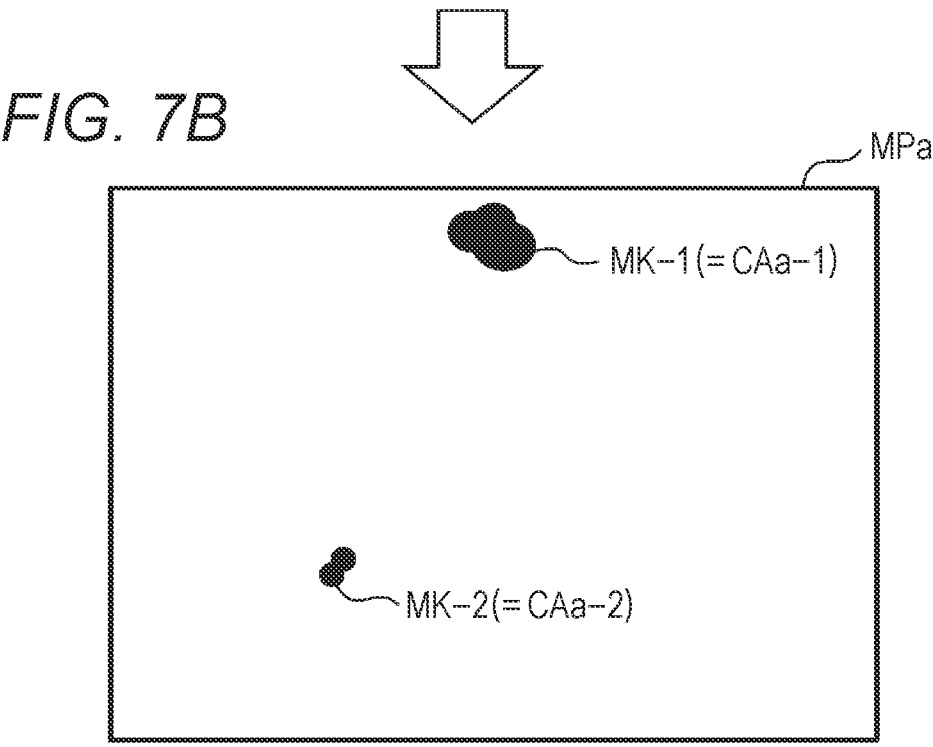
Figure 8:
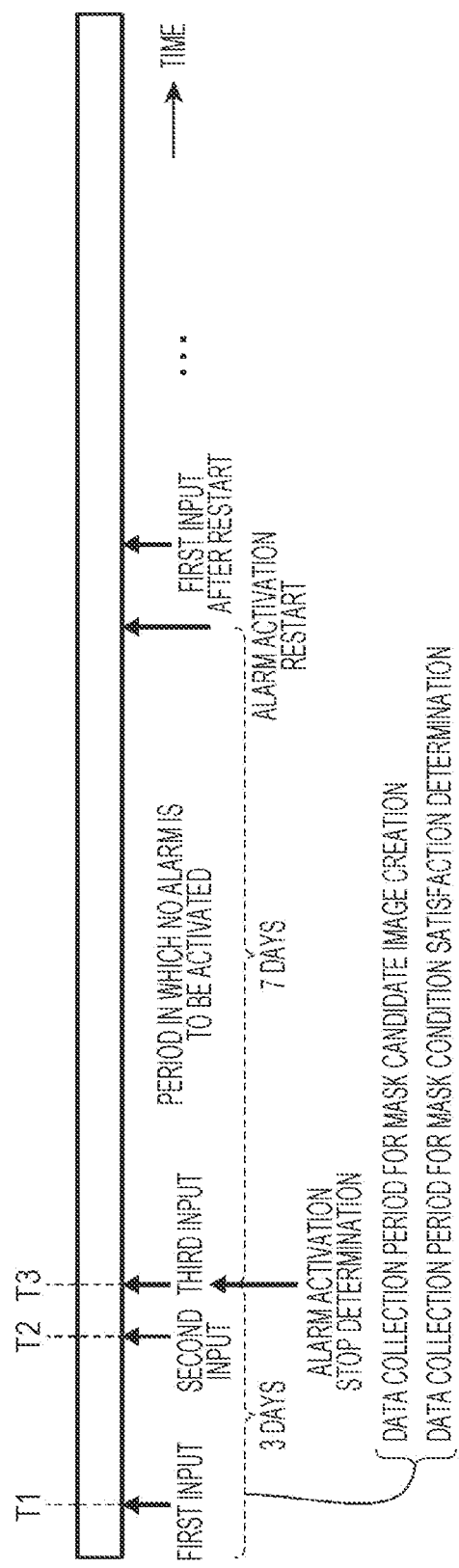
FIG. 8 is a time chart for explaining each generation process of the mask candidate image and the mask image performed by the gas monitoring device.

Next, the operation of the present embodiment will be described below. FIG. 2 is a flowchart illustrating operation of the gas monitoring device. FIGS. 3A and 3B are diagrams for explaining a gas detection image of a monitoring target used in the gas monitoring device, as an example. FIG. 3A schematically illustrates a gas detection image including one erroneously-detected gas area, and FIG. 3B schematically illustrates a gas detection image including two erroneously-detected gas areas. FIGS. 4A and 4B are diagrams for explaining an additional information input screen displayed on the gas monitoring device, as an example. FIG. 4A illustrates the additional information input screen before the input of the additional information, and FIG. 4B illustrates the additional information input screen after the input of the additional information. FIG. 5 is a diagram for explaining a visible image in a case where an image of the monitoring target is captured in a visible wavelength band, as an example. FIG. 6 is a diagram for explaining generation process of a mask candidate image performed by the gas monitoring device. FIGS. 7A and 7B are diagrams for explaining generation process of a mask image performed by the gas monitoring device. FIG. 7A illustrates a mask candidate image as an example, and FIG. 7B illustrates the mask image generated from the mask candidate image illustrated in FIG. 7A. FIG. 8 is a time chart for explaining each generation process of the mask candidate image and the mask image performed by the gas monitoring device.

When the power of the gas monitoring device D having such a configuration is turned on, the gas monitoring device D initializes necessary units and starts operating. By execution of the control processing program, the control unit 51, the gas detection processing unit 52a, the alarm activation suppression determination unit 53a, and the detection information processing unit 54 are functionally configured in the control processing unit 5.

Then, in a case where the imaging unit 1 is newly arranged at a predetermined fixed position to be able to image the monitoring target to monitor (monitor) the presence or absence of gas, in a case where the predetermined fourth period has elapsed, in a case where a mask image generation instruction is received from a user, or the like, operation of generating a mask image is started to determine whether or not to suppress the alarm activation, and the gas monitoring device D operates as follows regarding the generation process of the mask image.

In FIG. 2, first, the gas monitoring device D executes detection processing of the presence or absence of gas (S1). More specifically, the control processing unit 5 acquires, from the imaging unit 1, an image of the monitoring target generated by imaging the monitoring target by the imaging unit 1, and the gas detection processing unit 52a generates a gas detection image from the image of the monitoring target.

Next, the gas monitoring device D determines whether or not the presence of gas is detected in process S1 by the detection information processing unit 54 (S2). As a result of the determination, in a case where the presence of gas is detected (Yes), the gas monitoring device D next executes process S3, and, on the other hand, as a result of the determination, in a case where the presence of gas is not detected (No), the gas monitoring device D returns the processing to process S1. For example, in the present embodiment, since the gas detection image representing the presence or absence of gas for each pixel is generated by the gas detection processing unit 52a in process S1, in a case where any pixel in the gas detection image is a pixel representing the presence of gas, the gas monitoring device D determines that the presence of gas is detected, and, on the other hand, in a case where all pixels in the gas detection image are pixels representing the absence of gas, the gas monitoring device D determines that the presence of gas is not detected. For example, when a gas detection image GP-1 illustrated in FIG. 3A is generated by the gas detection processing unit 52a in process S1, since the gas detection image GP-1 includes a gas area GA-1 formed by combining a plurality of pixels at positions adjacent to each other with the presence of gas into one, the gas monitoring device D determines that the presence of gas is detected in process S2, and then executes process S3. Note that, the gas detection image GP does not include, for example, equipment (gas equipment) such as a tank, a pipe, and a valve illustrated in FIG. 5, but the gas equipment illustrated in FIG. 5 is illustrated by a broken line in FIGS. 3A and 3B to easily grasp a corresponding positional relationship between FIGS. 3A, 3B and 5. The same applies to the following.

In process S3, the gas monitoring device D receives the input of the additional information by the detection information processing unit 54, and stores the detection information in the storage unit 4.

More specifically, first, the detection information processing unit 54 displays the additional information input screen 60 on the display unit 3. An additional information input screen 60 is a screen for inputting the additional information, and includes, for example, as illustrated in FIGS. 4A and 4B, a gas detection image display area 61 for displaying the gas detection image, and an additional information input area 62 for inputting the additional information. The additional information input area 62 is provided on the additional information input screen 60 as a newly opened window near a gas area GA (gas area GA-1 in the example illustrated in FIGS. 4A and 4B). In the present embodiment, since the additional information is the alarm activation presence/absence information, the cause information, the checker information, and the input date and time information as described above, the additional information input area 62 includes an alarm activation cause input area 621 for inputting the cause information, an alarm activation suppression presence/absence input area 622 for inputting the alarm activation presence/absence information, a checker input area 623 for inputting the checker information, and an input date and time input area 624 for inputting the input date and time information. For example, when a cursor is placed on the areas 621 to 624 and the respective pieces of information are input to the areas 621 to 624 from the keyboard with respect to the additional information input screen 60 before the input of the additional information illustrated in FIG. 4A, the additional information input screen 60 after the input of the additional information illustrated in FIG. 4B is displayed on the display unit 3. Note that, when the cursor is placed on the areas 621 to 624, pull-down menus displaying a list of input candidates corresponding to the areas 621 to 624 are displayed, and the pieces of information may be input to the respective areas 621 to 624 by selecting one of the input candidates displayed in the list.

When the additional information is input in this way, the detection information processing unit 54 stores, in the detection information storage unit 41, as the detection information, the detection part in which the presence of gas is detected by the gas detection processing unit 52a in the image, in the present embodiment, the gas area GA, in association with the additional information received by the input unit 2.

In process S4 subsequent to process S3, the gas monitoring device D determines whether or not a predetermined period has elapsed. As a result of the determination, in a case where the predetermined period has elapsed, the gas monitoring device D next executes process S5, and, on the other hand, as a result of the determination, in a case where the predetermined period has not elapsed, the gas monitoring device D returns the processing to process S1. As a result, the detection information is collected, stored in the detection information storage unit 41, and accumulated, for the predetermined period.

In process S5, the gas monitoring device D generates the mask candidate image on the basis of the detection information stored in the detection information storage unit 41, for the predetermined period, by the first generation unit 531. More specifically, first, the first generation unit 531 generates the mask candidate image by setting the detection part associated with the additional information having the alarm activation presence/absence information representing that no alarm is to be activated as the mask candidate portion.

For example, in processes S1 to S4 repeatedly executed during the predetermined period, in a case where the gas detection image GP-1 including one gas area GA-1 illustrated in FIG. 3A is generated, the additional information including the alarm activation presence/absence information representing that no alarm is to be activated is associated with the gas area GA-1 and stored in the detection information storage unit 41 as detection information, a gas detection image GP-2 including two gas areas GA-2 and GA-3 illustrated in FIG. 3B is generated, and pieces of the additional information including the alarm activation presence/absence information representing that no alarm is to be activated are respectively associated with the gas area GA-2 and the gas area GA-3 and stored in the detection information storage unit 41 as detection information, the first generation unit 531, as illustrated in FIG. 6, sets the gas area GA-1 of the detection part as a candidate portion CAa-1, sets the gas area GA-2 of the detection part as a candidate portion CAa-2, and sets the gas area GA-3 of the detection part as a candidate portion CAa-3, thereby generating a mask candidate image CPa-1. Such generation of a candidate portion CAa is performed for all the detection information stored in the detection information storage unit 41, and a final mask candidate image CPa is generated.

Note that, in the example illustrated in FIG. 3A, the gas area GA-1 is an area in which water vapor is erroneously detected as gas, and in the example illustrated in FIG. 3B, the gas area GA-2 is an area in which water vapor is erroneously detected as gas, and the gas area GA-3 is an area in which a shadow of water vapor due to the sun is erroneously detected as gas.

In process S6 subsequent to process S5, the gas monitoring device D generates the mask image by setting a mask portion satisfying a predetermined mask condition as a mask, in the mask candidate image, by the second generation unit 532, and stores the mask image in the storage unit 4. More specifically, the second generation unit 532 aggregates the alarm activation presence/absence information representing that no alarm is to be activated for each of the detection part (in this example, the gas area GA) and the additional information, compares the aggregation result with the mask determination threshold value, determines the mask candidate portion of which the aggregation result is greater than or equal to the mask determination threshold value as the mask portion, and sets the determined mask portion as the mask, thereby generating the final mask image.

For example, in the mask candidate image CPa-1 of the example illustrated in FIG. 6, when the alarm activation presence/absence information representing that no alarm is to be activated is aggregated for each detection part, for each gas area GA in this example, the number of times of the information for a candidate portion CAa-12 in which the candidate portion CAa-1 (original gas area GA-1) and the candidate portion CAa-2 (original gas area GA-2) overlap is aggregated as two, and the number of times for each pixel belonging to the candidate portion CAa-12 is two depending on the aggregation result. The number of times of the information for the candidate portion CAa-1 and the candidate portion CAa-2 excluding the overlapping candidate portion CAa-12 is aggregated as one, and the number of times for each pixel belonging to the candidate portion CAa-1 and the candidate portion CAa-2 excluding the overlapping candidate portion CAa-12 is one depending on the aggregation result. The number of times of the information for the candidate portion CAa-3 (original gas area GA-3) is aggregated as one, and the number of times for each pixel belonging to the candidate portion CAa-3 is one depending on the aggregation result. Such aggregation is performed for all the detection information stored in the detection information storage unit 41.

Then, for each pixel, the aggregation result in the pixel is compared with the mask determination threshold value, and each pixel of which the aggregation result is greater than or equal to the mask determination threshold value is determined as the mask portion and used as the mask. For example, in the case of a mask candidate image CPa-2 having the three candidate portions CAa-1 to CAa-3 illustrated in FIG. 7A and in a case where the aggregation result of each pixel belonging to the two candidate portions CAa-1 and CAa-2 is greater than or equal to the mask determination threshold value, the two candidate portions CAa-1 and CAa-2 are determined as mask portions MK-1 and MK-2, respectively, and are used as mask, and, on the other hand, in a case where the aggregation result of each pixel belonging to the candidate portion CAa-3 is less than the mask determination threshold value, the candidate portion CAa-3 is not determined as a mask portion MK and is not used as a mask. As a result, a mask image MPa illustrated in FIG. 7B is generated from the mask candidate image CPa-2 illustrated in FIG. 7A. Note that, in FIG. 7A, a difference in the number of times as the aggregation result is illustrated with a difference in hatching.

The gas monitoring device D operates in this way, thereby generating the mask image. In one example, in a case where the predetermined period is three days, the mask determination threshold value is three times, and the predetermined fourth period is seven days, as illustrated in FIG. 8, for a certain detection part in the image of the monitoring target, when each piece of the additional information having the alarm activation presence/absence information representing that no alarm is to be activated is input to the certain detection part at each of time T1, time T2, and time T3 in each of the above-described processes S1 to S3 repeatedly executed from the start of generation of the mask image, the certain detection part is set as the mask portion by execution of each of the above-described processes S5 and S6 executed after three days have elapsed from the start of generation of the mask image, and the certain detection part is masked for the following seven days, and even if the presence of gas is detected in the certain detection part, the alarm is not activated. Then, when the seven days have elapsed, the setting of the mask portion as a mask is ended, and generation of the mask image is started again.

Next, a description will be given of the mask processing on the gas detection image using the mask image as described above. FIGS. 9A-9E are diagrams for explaining an alarm activation process of gas detection using the mask image. FIG. 9A schematically illustrates a mask image, FIG. 9B illustrates a gas detection image, FIG. 9C illustrates a case where an alarm of gas detection is not activated by performing the mask processing on the gas detection image illustrated in FIG. 9B with the mask image illustrated in FIG. 9A, FIG. 9D illustrates a gas detection image, and FIG. 9E illustrates a case where an alarm of gas detection is activated by performing the mask processing on the gas detection image illustrated in FIG. 9D with the mask image illustrated in FIG. 9A.

In a case where gas in the monitoring target is detected, next operation is repeatedly executed at a predetermined sampling interval, and the monitoring target is monitored.

First, the gas monitoring device D acquires a current image from the imaging unit 1, and generates a current gas detection image from the current original image by the gas detection processing unit 52a of the control processing unit 5.

Next, the gas monitoring device D performs the mask processing on the current gas detection image by using the mask image, by the alarm activation processing unit 533, and generates a gas detection image after the mask processing. More specifically, first, the alarm activation processing unit 533 determines whether or not a gas area indicating detection of gas is included in the current gas detection image. As a result of the determination, in a case where the gas area is not included, current present processing is ended, and, on the other hand, in a case where the gas area is included, the alarm activation processing unit 533 takes out (calls) the mask image stored in the storage unit 4. For example, the mask image MPa illustrated in FIG. 9A is taken out. Next, the alarm activation processing unit 533 determines, for each pixel belonging to the gas area, whether or not a pixel of the mask image at the same pixel position as a pixel position of the pixel is a mask pixel. As a result of the determination, the alarm activation processing unit 533 deletes the gas area from the gas detection image in a case where a ratio of pixels determined to be mask pixels to the gas area is greater than or equal to a predetermined second threshold value (alarm activation permission/non-permission determination threshold value) set in advance, and does not delete the gas area in a case where the ratio of the pixels determined to be the mask pixels is less than the alarm activation permission/non-permission determination threshold value. For example, as illustrated in FIGS. 9C and 9E, in a case where the mask image MPa illustrated in FIG. 9A is superimposed on the gas detection image GP-3 illustrated in FIG. 9B to be located at the same pixel position, and a ratio of the gas area overlapping the mask area is greater than or equal to the alarm activation permission/non-permission determination threshold value, the gas area is deleted from the gas detection image, and, on the other hand, in a case where the ratio of the gas area overlapping the mask area is less than the alarm activation permission/non-permission determination threshold value, the gas area is not deleted. More specifically, as illustrated in FIG. 9C, a gas area GA-4 in which the ratio is greater than or equal to the alarm activation permission/non-permission determination threshold value is deleted and notification is not performed, and as illustrated in FIG. 9E, a gas area GA-5 in which the ratio is less than the alarm activation permission/non-permission determination threshold value is not deleted and notification is performed. The alarm activation permission/non-permission determination threshold value (predetermined second threshold value) is, for example, appropriately set in advance from a plurality of samples, and is, for example, 65%, 70%, 75%, or the like in terms of a superimposition rate ((superimposition rate)=(area (number of pixels) of gas area overlapping mask area)/(area (number of pixels) of gas area)×100%).

Next, when such mask processing is ended, the alarm activation processing unit 533 activates an alarm of the presence of gas by displaying the gas detection image after the mask processing on the display unit 3.

The mask processing is performed by such operation, and an alarm of the presence of gas is activated.

As described above, the gas monitoring device D in the embodiment and the gas monitoring method and the gas monitoring program implemented in the gas monitoring device D receive an input of predetermined additional information including the alarm activation presence/absence information representing whether or not to activate an alarm, and determine whether or not to suppress the alarm activation of the presence of gas on the basis of the received additional information, for a predetermined period. For this reason, the gas monitoring device D, the gas monitoring method, and the gas monitoring program receive an input of an observer (user, operator) in consideration of, for example, a cause of detection, continuity of subsequent alarm activation, and the like, thereby being able to reduce the alarm activation determined to be unnecessary while using the gas monitoring device, and thus, false alarms can be reduced.

Since the gas monitoring device D, the gas monitoring method, and the gas monitoring program include the detection information storage unit 41, the consideration of the observer can be stored (recorded), and even in a case where the observer is changed, the changed observer can refer to the previous consideration, and the false alarms can be reduced in consideration with continuity.

In the gas monitoring device D, the gas monitoring method, and the gas monitoring program, since the additional information includes the cause information, suppression of alarm activation can be determined in consideration of the cause information, and the false alarms can be reduced. Furthermore, in the gas monitoring device D, the gas monitoring method, and the gas monitoring program, since the additional information includes the checker information, suppression of alarm activation can be determined in consideration of the checker information, and the false alarms can be reduced.

Since the gas monitoring device D, the gas monitoring method, and the gas monitoring program suppress the alarm activation only for the fourth period, the suppression of the alarm activation can be adapted to a change in the monitoring target depending on a lapse of time.

Note that, in the above-described embodiment, the gas monitoring device D may display, by the control processing unit 5, on the display unit 3, the detection information received by the input unit 2 in the past and stored in the detection information storage unit 41 (first modification). Such a gas monitoring device D can refer to the past detection information, and it also becomes possible to use the past detection information as a reference when current additional information is input.

FIG. 10 is a diagram for explaining a past additional information display screen displayed on the gas monitoring device, as an example, in the first modification. For example, when an instruction to display past additional information is selected in a main menu (not illustrated), the control processing unit 5 displays a past additional information display screen 70 illustrated in FIG. 10 on the display unit 3. The past additional information display screen 70 is a screen for displaying past additional information, and includes, for example, a monitoring target image display area 71 that displays an image of a monitoring target generated by the imaging unit 1, and a past additional information display area 72 that displays past additional information. For example, when a part (designated portion, an elliptical portion indicated by a broken line in the example illustrated in FIG. 10) of a monitoring target image displayed in the monitoring target image display area 71 is designated by a cursor, the past additional information display area 72 is provided as a newly opened window on the past additional information display screen 70, near the designated part, by the control processing unit 5. The past additional information display area 72 includes an alarm activation cause display area 721 for displaying the cause information, an alarm activation suppression presence/absence display area 722 for displaying the alarm activation presence/absence information, a checker display area 723 for displaying the checker information, and an input date and time display area 724 for displaying the input date and time information. With the designated portion as a detection part, these areas 721 to 724 respectively displays the cause information, the alarm activation presence/absence information, the checker information, and the input date and time information in the past additional information associated with the detection part and stored in the detection information storage unit 41. Note that, in a case where a plurality of pieces of additional information is associated with the designated portion via the detection part, the plurality of pieces of additional information may be sequentially displayed in a list display or by sequentially switching display contents of the areas 721 to 724.

Furthermore, in the above-described embodiment, the gas monitoring device D may display, on the display unit 3, a suppression part for which it is determined by the alarm activation suppression determination unit to suppress the alarm activation in the image (second modification). Such a gas monitoring device can refer to a current alarm activation suppression part in the image. In the above-described embodiment, since the suppression of the alarm activation is performed by a mask portion of the mask image MPa, the mask portion corresponds to an example of the suppression part, and the suppression part is displayed on the display unit 3 by displaying the mask image MPa generated by the second generation unit 532 on the display unit 3.

FIG. 11 is a diagram for explaining a mask image display screen displayed on the gas monitoring device, as an example, in the second modification. For example, when an instruction to display a mask image is selected in the main menu (not illustrated), the control processing unit 5 displays a mask image display screen 80 illustrated in FIG. 11 on the display unit 3. The mask image display screen 80 is a screen for displaying the current mask image MPa, and includes, for example, a mask image display area 81 that displays the current mask image MPa stored in the storage unit 4 and a remaining valid days display area 82 that displays remaining valid days of the current mask image MPa. For example, when a mask portion in the mask image MPa displayed in the mask image display area 81 is designated by a cursor, the remaining valid days display area 82 is provided on the mask image display screen 80 as a newly opened window, near the mask portion, by the control processing unit 5. The remaining valid days display area 82 displays the number of days, in the predetermined fourth period, from the day on which the mask image display screen 80 is displayed to the end date of the predetermined fourth period. Note that, an expiration date may be displayed instead of the remaining valid days.

Figure 12A:
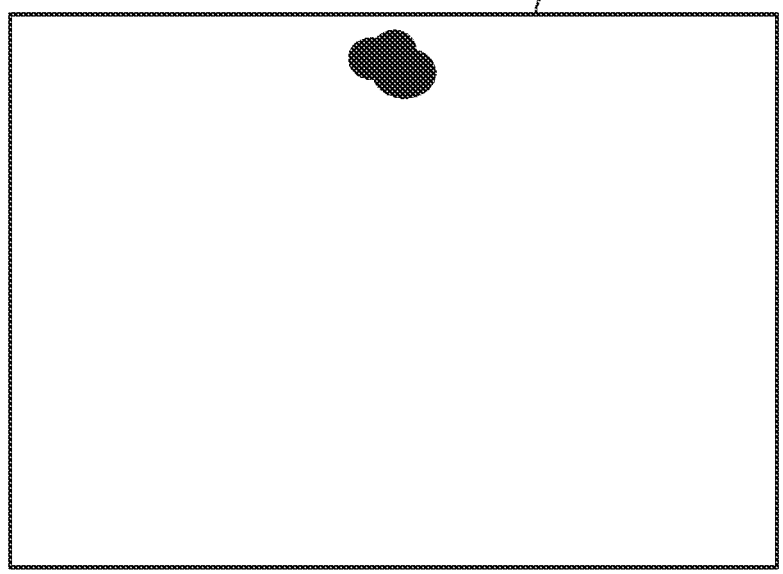
FIGS. 12A and 12B are diagrams for explaining a mask image in a third modification.
Figure 12B:
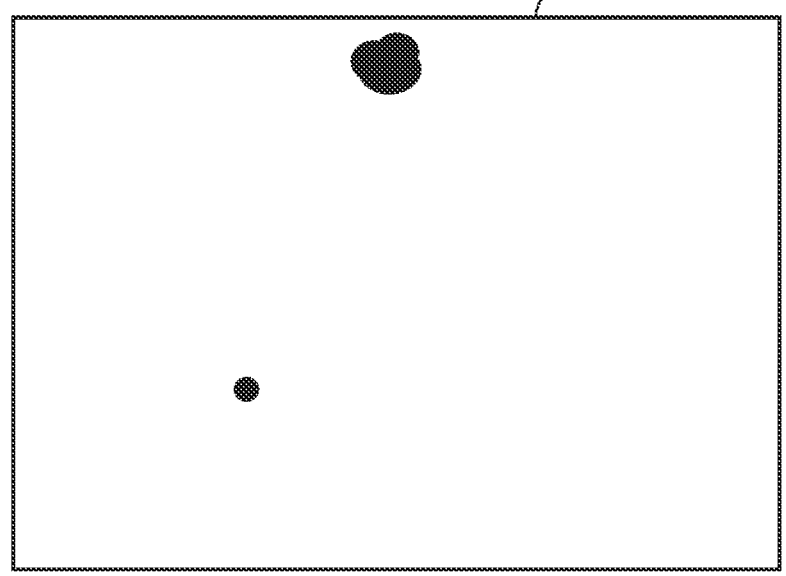

Furthermore, in the above-described embodiment and the modifications thereof, the alarm activation suppression determination unit 53a may aggregate the number of times of the alarm activation presence/absence information representing that no alarm is to be activated, for each of a plurality of different time zones, by the first and second generation units 531 and 532, and generate the mask image MPa for each of the plurality of time zones, and the alarm activation suppression determination unit 53a may perform the mask processing on the gas detection image by using the mask image MPa in a time zone including an imaging time of the gas detection image, by the alarm activation processing unit 533, and display the gas detection image after the mask processing on the display unit 3 (third modification). FIGS. 12A and 12B are diagrams for explaining a mask image in the third modification. For example, a mask image MPa-1 in a time zone from 0:00 to 2:00 illustrated in FIG. 12A and a mask image MPa-2 in a time zone from 9:00 to 11:00 illustrated in FIG. 12B are generated. Of course, the mask image MPa in another time zone may be generated. The change in the monitoring target may change depending on a time zone, such as a change in a solar radiation direction with respect to the monitoring target. Such a gas monitoring device D, a gas monitoring method, and a gas monitoring program performs aggregation for each of the plurality of time zones and generate a mask image MPa for each of the time zones, so that it is possible to generate a more appropriate mask image MPa according to the time zone.

Furthermore, in the above-described embodiment and the modifications thereof, the gas monitoring device D includes the gas detection processing unit 52a and sets the gas area as the detection part; however, a gas detection processing unit 52b may be included instead of the gas detection processing unit 52a, and a pixel at a centroid position of the gas area may be set as the detection part (fourth modification). That is, in the fourth modification, the detection part is a pixel at a centroid position of a gas area formed by combining a plurality of pixels at positions adjacent to each other with the presence of gas into one. Such a gas monitoring device D can associate the additional information in units of the centroid position of the gas area.

FIGS. 13A and 13B are diagrams for explaining the centroid position of the gas area in the fourth modification. FIG. 13A schematically illustrates a gas detection image in which two gas areas are detected, as an example, and FIG. 13B illustrates centroid positions of the respective gas areas illustrated in FIG. 13A. FIGS. 14A and 14B are diagrams for explaining each generation process of a mask candidate image and a mask image in the fourth modification. FIG. 14A is a diagram for explaining each generation process of the mask candidate image, and FIG. 14B is a diagram schematically illustrating the mask image, as an example. Note that, in FIGS. 13B and 14A, the contour line of the gas area is indicated by a broken line. FIGS. 15A-15E are diagrams for explaining an alarm activation process of gas detection using the mask image in the fourth modification. FIG. 15A schematically illustrates a mask image, FIG. 15B illustrates a gas detection image, FIG. 15C illustrates a case where notification of gas detection is not performed by performing the mask processing on the gas detection image illustrated in FIG. 15B with the mask image illustrated in FIG. 15A, FIG. 15D illustrates a gas detection image, and FIG. 15E illustrates a case where notification of gas detection is performed by performing the mask processing on the gas detection image illustrated in FIG. 15D with the mask image illustrated in FIG. 15A.

In the fourth modification, the gas detection processing unit 52b obtains the gas area GA by processing similar to that by the gas detection processing unit 52a, obtains a centroid position of the obtained gas area GA, and obtains a pixel corresponding to the obtained centroid position of the gas area as the detection part. The centroid position of the gas area is, for example, a coordinate average value, the X coordinate is obtained by dividing the sum of the X coordinate positions of all the pixels in the gas area by the number of pixels in the gas area, and the Y coordinate is obtained by dividing the sum of the Y coordinate positions of all the pixels in the gas area by the number of pixels in the gas area. For example, in the case of a gas detection image GP-5 having gas areas GA-6 and GA-7 illustrated in FIG. 13A, a centroid position Pc-1 of the gas area GA-6 and a centroid position Pc-2 of the gas area GA-7 are obtained as illustrated in FIG. 13B. Note that, the centroid position of the gas area may be obtained by another calculation method, not limited to the above-described calculation method.

The first generation unit 531 generates a mask candidate image by setting a detection part (here, a pixel at the centroid position of the gas area) associated with additional information having alarm activation presence/absence information representing that no alarm is to be activated as a mask candidate portion. For example, in FIG. 14A, in a case where a gas detection image PP-1 including the centroid positions Pc-1 and Pc-2 of the two gas areas is generated, additional information including alarm activation presence/absence information representing that no alarm is to be activated is associated with each of pixels of the centroid positions Pc-1 and Pc-2 of the two gas areas and stored as detection information in the detection information storage unit 41, a gas detection image PP-2 including a centroid position Pc-3 of one gas area is generated, and additional information including alarm activation presence/absence information representing that no alarm is to be activated is associated with a pixel at the centroid position Pc-3 of the gas area and stored as detection information in the detection information storage unit 41, the first generation unit 531 sets a pixel at the centroid position Pc-1 of the gas area as the detection part as a candidate portion CAb-1, sets a pixel at the centroid position Pc-2 of the gas area as the detection part as a candidate portion CAb-2, and sets a pixel at the centroid position Pc-3 of the gas area as the detection part as a candidate portion CAb-3, thereby generating a mask candidate image CPb-1. Such generation of a candidate portion CAb is performed for all the detection information stored in the detection information storage unit 41, and a final mask candidate image CPb is generated.

Then, the second generation unit 532 generates a mask image by setting, for such a mask candidate image CPb, a mask portion satisfying a predetermined mask condition in the mask candidate image CPb as a mask similarly to the above, and stores the mask image in the storage unit 4. More specifically, for each detection part (in this example, a pixel at the centroid position of the gas area) and additional information, the second generation unit 532 aggregates the alarm activation presence/absence information representing that no alarm is to be activated, compares the aggregation result with the mask determination threshold value, determines a mask candidate portion of which the aggregation result is greater than or equal to the mask determination threshold value as a mask portion, and sets the determined mask portion as a mask, thereby generating the mask image.

For example, in the mask candidate image CPb-1 of the example illustrated in FIG. 14A, when the alarm activation presence/absence information representing that no alarm is to be activated is aggregated for each detection part, in this example, for each pixel at a centroid position Pc of the gas area, the numbers of times of the information for the candidate portion CAb-1 (pixel at the centroid position Pc-1 of the original gas area), the candidate portion CAb-2 (pixel at the centroid position Pc-2 of the original gas area), and the candidate portion CAb-3 (pixel at the centroid position Pc-3 of the original gas area) each are aggregated as one, and the number of times of the information is one for each pixel of the candidate portions CAb-1 to CAb-3 depending on the aggregation result (since the candidate portion CAb is the centroid position Pc of the gas area, the candidate portion CAb is one pixel). Such aggregation is performed for all the detection information stored in the detection information storage unit 41.

Then, for each pixel, the aggregation result in the pixel is compared with the mask determination threshold value, and the mask candidate portion in which the aggregation result is greater than or equal to the mask determination threshold value is determined as the mask portion and is set as the mask. As a result, for example, a mask image MPb having two mask portions MK-3 and MK-4 illustrated in FIG. 14B is generated. Note that, in the mask image MPb in FIG. 14B, the mask portions MK-3 and MK-4 are illustrated as areas formed by combining a plurality of mask pixels at positions adjacent to each other into one.

The alarm activation processing unit 533 performs the alarm activation by performing the mask processing on the gas detection image by using the mask image as follows and displaying the gas detection image after the mask processing on the display unit 3. More specifically, first, the alarm activation processing unit 533 determines whether or not a gas area indicating detection of gas is included in the current gas detection image. As a result of the determination, in a case where the gas area is not included, current present processing is ended, and, on the other hand, in a case where the gas area is included, the alarm activation processing unit 533 takes out the mask image stored in the storage unit 4. For example, the mask image MPb illustrated in FIG. 15A is taken out. Next, the alarm activation processing unit 533 obtains, for each gas area included in the gas detection image, a pixel at the centroid position of the gas area. Next, the alarm activation processing unit 533 determines, for each gas area included in the gas detection image, whether or not the pixel at the centroid position of the gas area is a mask pixel. As a result of the determination, the alarm activation processing unit 533 deletes the gas area from the gas detection image in a case where the pixel is the mask pixel, and does not delete the gas area in a case where the pixel is not the mask pixel. For example, as illustrated in FIGS. 15C and 15E, in a case where the mask image MPb illustrated in FIG. 15A is superimposed on the gas detection image GP-3 illustrated in FIG. 15B so that they are in the same pixel position, and a centroid position Pc-4 of the gas area GA-4 is a pixel in the mask portion MK-3, the gas area GA-4 is deleted from the gas detection image GP-3 and notification is not performed, and, on the other hand, in a case where a centroid position Pc-5 of the gas area GA-5 is neither a pixel in the mask portion MK-3 nor a pixel in the mask portion MK-4, the gas area GA-5 is not deleted and notification is performed. Then, when the mask processing is ended, the alarm activation processing unit 533 activates an alarm of the presence of gas by displaying the gas detection image after the mask processing on the display unit 3.

Furthermore, in the above-described embodiment and the modifications thereof, the gas monitoring device D simultaneously performs, by a mask generation unit 55a including the first generation unit 531, collection of data for creating a mask candidate image CP (CPa, CPb) and collection of data for determining whether or not the mask condition is satisfied, in the predetermined period (for example, a data collection period for mask candidate image creation and a data collection period for mask condition satisfaction determination illustrated in FIG. 8), and generates, by the mask generation unit 55a including the first generation unit 531, the mask candidate image CP and a mask image MP (MPa, MPb) on the basis of the detection information collected in the predetermined period after the lapse of the predetermined period; however, as illustrated in FIG. 16A, the gas monitoring device D may generate the mask candidate image CP by collecting data for generating the mask candidate image CP in the data collection period for mask candidate image creation, and generate the mask image MP by collecting data for determining whether or not the mask condition is satisfied, in the data collection period for mask condition satisfaction determination, for the generated mask candidate image CP (fifth modification). Such a gas monitoring device D, a gas monitoring method, and a gas monitoring program can automatically generate the mask candidate image CP on the basis of an aggregation result obtained by aggregating the number of times of detection in which the presence of gas is detected.

The first generation unit 531 in such a gas monitoring device D generates the mask candidate image on the basis of an aggregation result obtained by aggregation in a predetermined aggregation unit of the number of times of detection in which the presence of gas is detected on the basis of a plurality of images captured at a plurality of different times in a predetermined third period (data collection period for mask candidate image creation) set in advance. The predetermined third period (data collection period for mask candidate image creation) may be appropriately set by using, for example, a plurality of samples, but is preferably longer than the predetermined period to generate a more appropriate mask candidate image.

More specifically, for example, as illustrated in FIG. 16A, during the data collection period for mask candidate image creation, the gas monitoring device D monitors the presence or absence of gas in the monitoring target, and in a case where the presence of gas is detected, the presence of gas and the gas area GA (the centroid position of the gas area may be used instead of the gas area GA) are stored in the storage unit 4 in association with each other. When the data collection period for mask candidate image creation ends, the first generation unit 531 aggregates the number of times of detection of the presence of gas for each pixel, and compares the number of times of detection of the presence of gas with a predetermined third threshold value (candidate determination threshold value) set in advance for each pixel, and, as a result of the comparison, in a case where the number of times of detection of the gas is greater than or equal to the candidate determination threshold value, the pixel is set as a mask candidate portion (mask candidate pixel), and, on the other hand, as the result of the comparison, in a case where the number of times of detection of the gas is less than the candidate determination threshold value, the pixel is not set as a mask candidate portion. The candidate determination threshold value (the predetermined third threshold value) is appropriately set in advance from a plurality of samples, for example. The candidate determination threshold value is, for example, 0.1%, 0.05%, 0.01%, or the like in terms of appearance rate ((appearance rate)= (number of times of detection of presence of gas)/(total number of images in a predetermined second period)× 100%). As a result, for example, a mask candidate image CPc illustrated in FIG. 16B is generated. The mask candidate image CPc includes two candidate portions CA-1 and CA-2.

On the other hand, during the data collection period for mask condition satisfaction determination, the gas monitoring device D executes each of the above processes S1 to S4 described with reference to FIG. 2, and accumulates the detection information in the detection information storage unit 41. Then, when the data collection period for mask condition satisfaction determination ends, for the mask candidate image generated from the data collected in the predetermined third period, similarly to the above, for each of the detection part and the additional information, the gas monitoring device D aggregates, by the second generation unit 532, the alarm activation presence/absence information representing that no alarm is to be activated, compares the aggregation result with the mask determination threshold value, determines a mask candidate portion of which the aggregation result is greater than or equal to the mask determination threshold value as the mask portion, and sets the determined mask portion as the mask, thereby generating the mask image. For example, in the mask candidate image CPc illustrated in FIG. 16B, the candidate portion CA-1 has its aggregation result greater than or equal to the mask determination threshold value and is determined as the mask portion, the candidate portion CA-2 has its aggregation result less than the mask determination threshold value and is not determined as the mask portion, and as a result, as illustrated in FIG. 16C, a mask image MPc including the candidate portion CA-1 as the mask portion MK is generated.

In the example illustrated in FIG. 16A, since the end time point of the data collection period for mask candidate image creation and the end time point of the data collection period for mask condition satisfaction determination coincide with each other, and the data collection period for mask candidate image creation is longer than the data collection period for mask condition satisfaction determination, the data collection period for mask candidate image creation is started at a time point before the start time point of the data collection period for mask condition satisfaction determination, and the data collection period of the mask condition satisfaction determination is started during the data collection period for mask candidate image creation. Note that, the end time point of the data collection period for mask candidate image creation and the end time point of the data collection period for mask condition satisfaction determination do not necessarily have to be caused to completely coincide with each other, but the data collection period for mask candidate image creation is desirably a new time, to generate the mask candidate image reflecting the latest situation.

Furthermore, in the above-described embodiment and the modifications thereof, the additional information is input from the input unit 2 each time the presence of gas is detected, but the gas monitoring device D may be configured such that the input unit 2 collectively receives the input of the additional information in the predetermined second period (sixth modification). Such a gas monitoring device D, a gas monitoring method, and a gas monitoring program can collectively input the additional information, and can reduce trouble of input by the user (operator).

More specifically, when detecting the presence of gas, the gas monitoring device D stores the gas detection image in the storage unit 4 in association with the detection time, and at a predetermined input timing (for example, one hour before the end of working time, or the like), sequentially displays the gas detection images stored in the storage unit 4 from the previous input timing to the current input timing on the additional information input screen 60, sequentially receives the input of the additional information, and sequentially stores the detection information in the detection information storage unit 41. Alternatively, when detecting the presence of gas, the gas monitoring device D stores the gas detection image in the storage unit 4 in association with the detection time, and at a predetermined input timing, aggregates the gas detection images stored in the storage unit 4 from the previous input timing to the current input timing, thereby generating a detection frequency image as illustrated in FIG. 7A and displaying the detection frequency image on the additional information input screen 60, sequentially receives the input of the additional information for each aggregated detection part, and sequentially stores the detection information in the detection information storage unit 41. As a result, the additional information from the previous input timing to the current input timing is collectively input. Accordingly, the additional information can be input even in a case where the presence of gas is detected while the user is absent (for example, a time zone outside working time).

Furthermore, in the above-described embodiment and the modifications thereof, when determining not to activate an alarm for the detection part, the alarm activation suppression determination unit 53a may suppress the alarm activation for pixels within a predetermined distance from the detection part. Accordingly, no alarm is to be activated for not only the detection part but also peripheral pixels of the detection part, so that enlargement is possible compared to a case where no alarm is to be activated for only the detection part (seventh modification). In one example, the second generation unit 532 of the alarm activation suppression determination unit 53a determines whether or not the mask condition is satisfied for each pixel of the mask candidate image generated by the first generation unit 531, sets a pixel satisfying the mask condition and peripheral pixels within a predetermined distance from the pixel as the mask portion, and sets the mask portion as the mask, thereby generating the mask image. Such a gas monitoring device D, a gas monitoring method, and a gas monitoring program set not only the pixel but also the peripheral pixels of the pixel as the mask portion, so that the mask portion can be enlarged as compared with a case where only the pixel is set as the mask portion. In a case where the detection part is a pixel at the centroid position of the gas area, it is preferable to use such a seventh modification.

Furthermore, in the above-described embodiment and the modifications thereof, the alarm activation suppression determination unit 53a may determine the length (period length) of the fourth period on the basis of a second aggregation result obtained by aggregating the alarm activation presence/absence information representing that no alarm is to be activated for each of the detection part and the additional information, for the predetermined period (eighth modification). For example, the fourth period is set to be longer as the second aggregation result (the number of pieces of the alarm activation presence/absence information representing that no alarm is to be activated) is greater (larger). As the number of pieces of the alarm activation presence/absence information representing that no alarm is to be activated is larger, the probability that the alarm activation is continuously suppressed for the detection part is higher, and it is less necessary to determine again whether or not to suppress the alarm activation for the detection part. Such a gas monitoring device D, a gas monitoring method, and a gas monitoring program determine the length of the fourth period on the basis of the second aggregation result obtained by aggregating the alarm activation presence/absence information representing that no alarm is to be activated, and thus, it is possible to determine whether or not to suppress the alarm activation at more appropriate timing (time).

Furthermore, in the above-described embodiment and the modifications thereof, the gas monitoring device D may include, instead of the alarm activation suppression determination unit 53a, an alarm activation suppression determination unit 53*b* that determines whether or not to activate an alarm of the presence of gas detected by a gas detection processing unit 52 (52*a*, 52*b*) by using a machine learning model that determines whether or not to suppress the alarm activation of the presence of gas detected by the gas detection processing unit 52, the machine learning model being subjected to machine learning on the basis of the additional information received by the input unit 2 for a predetermined period (ninth modification). As the machine learning model, a known machine learning model can be used, and for example, a convolutional neural network (CNN) is used. Such a gas monitoring device D, a gas monitoring method, and a gas monitoring program can determine whether or not to suppress the alarm activation of the presence of gas detected by the gas detection processing unit 52 by using a machine learning model.

Figure 17A:
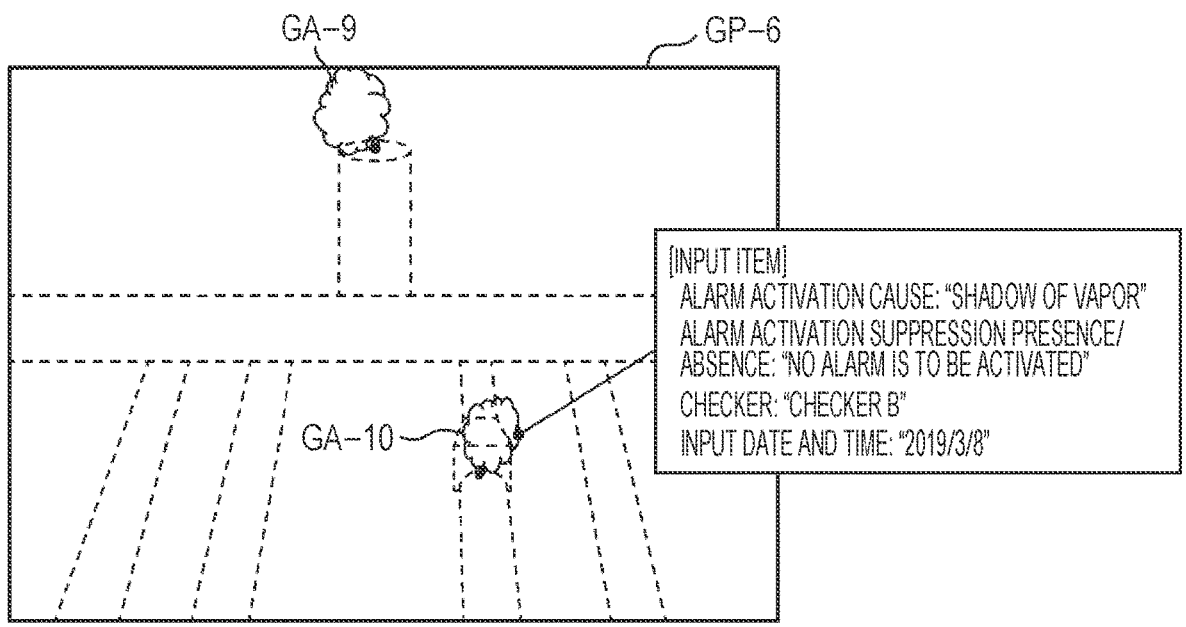
FIGS. 17A and 17B are diagrams for explaining a gas detection image and additional information used for machine learning, as an example, in a ninth modification.
Figure 17B:
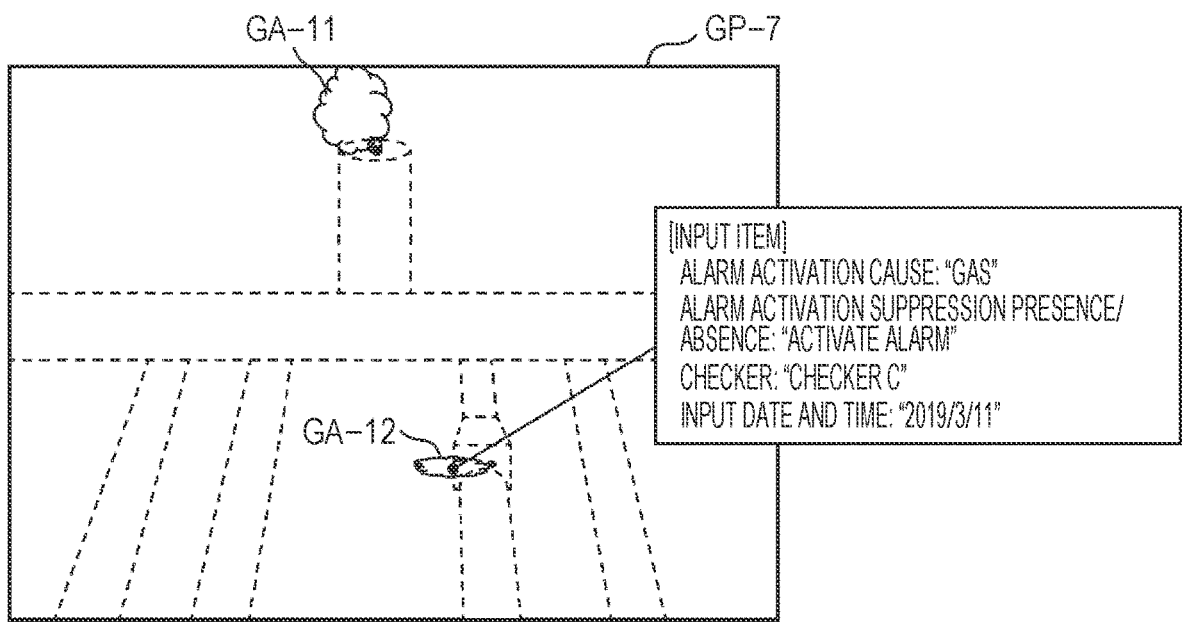

FIGS. 17A and 17B are diagrams for explaining a gas detection image and additional information used for machine learning, as an example, in the ninth modification. FIG. 17A illustrates a first sample and FIG. 17B illustrates a second sample.

In this case, as indicated by a broken line in FIG. 1, the gas monitoring device D may further functionally include, in the control processing unit 5, a model generation unit 55 that generates the machine learning model by machine learning using the detection information stored in the detection information storage unit 41 and the gas detection image used to detect the detection part of the detection information. The model generation unit 55 performs machine learning on a machine learning model before machine learning by using the detection information stored in the detection information storage unit 41 and the gas detection image used to detect the detection part of the detection information, generates a machine learning model after machine learning, and stores the machine learning model after machine learning in the storage unit 4. For example, gas detection images GP-6 and GP-7 illustrated in FIGS. 17A and 17B and detection information corresponding thereto are so-called learning data. In the machine learning, the alarm activation presence/absence information is a teacher (answer) for the gas area of the gas detection image and the pixel at the centroid position thereof. Since the alarm activation presence/absence information includes alarm activation absence information as illustrated in FIG. 17A and alarm activation presence information as illustrated in FIG. 17B, by performing machine learning using learning data including such alarm activation presence/absence information, the machine learning model after the machine learning can activate an alarm for only an area where alarm activation is desired by the observer, in the gas detection image. In other words, the machine learning model after the machine learning can suppress the alarm activation of an area where the alarm activation of the observer is not desired, in the gas detection image. Note that, shapes of gas areas GA-9 to GA-12 may also be used as the learning data.

Furthermore, in the above-described embodiment and the modifications thereof, the predetermined period is started and the predetermined fourth period is started, uniformly, for the entire pixels in the mask image MPa; however, for each pixel in the mask image MPa, the predetermined period may be started at a time point at which additional information including the alarm activation presence/absence information representing that no alarm is to be activated is first associated with, and after the end of the predetermined period, the predetermined fourth period may be started in a case where a mask condition is satisfied and a mask image is obtained, and on the other hand, the predetermined period may be started again in a case where a mask condition is not satisfied and a mask image is not obtained (tenth modification).

Furthermore, in the above-described embodiment and the modifications thereof, when the presence or absence of gas leakage is monitored by using the gas monitoring device D, in a case where there is gas leakage, feedback and a video by an input may be shared as knowledge in a head office or another plant in a company (eleventh modification). Accordingly, it is possible to contribute to safety of the entire plant, and is effective when monitoring of a plurality of plants is centrally managed in the head office or the like.

Furthermore, in the above-described embodiment and the modifications thereof, repair history information may be added as the additional information. Alternatively, a video at the time of gas leakage may be added as the additional information. When the additional information is input, the video of the gas leakage is selected and stored in association, and can be reproduced when the past additional information is displayed. In addition to the selection at the time of input, the information may be automatically associated and stored at the time of alarm activation (twelfth modification).

For example, in a case where a plurality of similar facilities is used, it is possible to share what causes the leakage and what kind of gas leakage has occurred there, and it is possible to prevent the gas leakage in advance by utilization for maintenance in similar equipment in another plant. Furthermore, even in a case where leakage occurs, it is possible to confirm a video at the time of past leakage, and for example, it is possible to confirm a situation of the leakage such as how the gas spreads, and it is possible to share what kind of measure or repair has been performed in the past, so that it is possible to quickly take a correct measure.

Furthermore, in the above-described embodiment and the modifications thereof, an example has been described throughout in which a fixed camera is used that captures an image of a specific field of view, but the present invention can also be applied to a pan-tilt camera that regularly monitors a plurality of fields of view. In the case of the pan-tilt camera, the mask or the machine learning model is applied individually for each field of view.

The present specification discloses technologies of various aspects as described above, and main technologies thereof are summarized below.

A gas monitoring device according to one aspect of the present invention is a device that monitors presence or absence of gas in a monitoring target and activates an alarm of presence of gas in a case where the presence of gas is detected, and the device includes: a gas detection unit that detects presence or absence of a predetermined gas on the basis of an image obtained by imaging the monitoring target; an input unit that receives an input of predetermined additional information including alarm activation presence/absence information representing whether or not to activate an alarm; and an alarm activation suppression determination unit that determines whether or not to suppress alarm activation of the presence of gas detected by the gas detection unit on the basis of the additional information received by the input unit.

Such a gas monitoring device receives an input of predetermined additional information including alarm activation presence/absence information representing whether or not to activate an alarm, and determines whether or not to suppress the alarm activation of the presence of gas on the basis of the received additional information. For this reason, the gas monitoring device receives an input of an observer (user, operator) in consideration of, for example, a cause of detection, continuity of subsequent alarm activation, and the like, thereby being able to reduce the alarm activation determined to be unnecessary while using the gas monitoring device, and thus, false alarms can be reduced.

According to another aspect, the above-described gas monitoring device further includes a detection information storage unit that stores, as detection information, a detection part in which the presence of gas is detected by the gas detection unit in the image in association with the additional information received by the input unit.

Since such a gas monitoring device further includes the detection information storage unit, the consideration of the observer can be stored (recorded), and even in a case where the observer is changed, the changed observer can refer to the previous consideration, and the false alarms can be reduced in consideration with continuity.

In another aspect, in these gas monitoring devices described above, the gas detection unit detects presence or absence of gas for each of pixels of the image, and the detection part is a pixel at a centroid position of a gas area formed by combining a plurality of pixels at positions adjacent to each other with presence of gas into one.

Such a gas monitoring device can associate the additional information in units of centroid positions of the gas areas.

In another aspect, in these gas monitoring devices described above, the additional information includes cause information representing a cause of detection of presence of gas by the gas detection unit.

In such a gas monitoring device, since the additional information includes the cause information, suppression of alarm activation can be determined in consideration of the cause information, and the false alarms can be reduced.

In another aspect, in these gas monitoring devices described above, the input unit collectively receives an input of the additional information in a predetermined second period.

Such a gas monitoring device can collectively input the additional information, and can reduce trouble of input by the observer.

In another aspect, in these gas monitoring devices described above, the alarm activation suppression determination unit suppresses alarm activation of a pixel within a predetermined distance from the detection part when determining not to perform alarm activation of the detection part.

Such a gas monitoring device does not activate an alarm for not only the detection part but also peripheral pixels of the detection part, so that enlargement is possible compared to a case where no alarm is to be activated for only the detection part.

In another aspect, in these gas monitoring devices described above, the alarm activation suppression determination unit determines whether or not to suppress the alarm activation on the basis of an aggregation result obtained by aggregation in a predetermined aggregation unit of the number of times of detection in which presence of gas is detected by the gas detection unit on the basis of a plurality of images captured at a plurality of different times in a predetermined third period. Preferably, the alarm activation suppression determination unit includes: a first generation unit that generates a mask candidate image that is a candidate for a mask image for suppressing alarm activation of presence of gas detected, on the basis of the additional information received by the input unit, for a predetermined period; a second generation unit that generates the mask image by setting a mask portion that satisfies a predetermined mask condition as a mask in the mask candidate image generated by the first generation unit; and an alarm activation processing unit that determines whether or not to activate an alarm of the presence of gas in the detection part by performing mask processing on the detection part with the mask image, in which the first generation unit generates the mask candidate image on the basis of an aggregation result obtained by aggregation in a predetermined aggregation unit of the number of times of detection in which the presence of gas is detected by the gas detection unit on the basis of a plurality of images captured at a plurality of different times in a predetermined third period.

Such a gas monitoring device can automatically generate the mask candidate image on the basis of the aggregation result obtained by aggregating the number of times of detection of the presence of gas.

In another aspect, in these gas monitoring devices described above, the alarm activation suppression determination unit suppresses the alarm activation for a predetermined fourth period from a time point at which it is determined to suppress the alarm activation.

Since such a gas monitoring device suppresses the alarm activation only for the fourth period, the suppression of the alarm activation can be adapted to a change in the monitoring target depending on a lapse of time.

In another aspect, in the above-described gas monitoring device, the alarm activation suppression determination unit determines a length of the fourth period, on the basis of an aggregation result obtained by aggregating alarm activation presence/absence information representing that no alarm is to be activated, for each of the detection part and the additional information, for the predetermined period.

As the number of pieces of the alarm activation presence/absence information representing that no alarm is to be activated is larger, the probability that the alarm activation is continuously suppressed for the detection part is higher, and it is less necessary to determine again whether or not to suppress the alarm activation for the detection part. Since the gas monitoring device determines the length (period length) of the fourth period on the basis of the second aggregation result obtained by aggregating the alarm activation presence/absence information representing that no alarm is to be activated, it is possible to determine whether or not to suppress the alarm activation at more appropriate timing (time).

In another aspect, in these gas monitoring devices described above, a display unit is further included that displays detection information stored in the detection information storage unit.

Since such a gas monitoring device includes the display unit, the past detection information can be referred to, and it also becomes possible to refer to the past detection information when inputting the present additional information.

In another aspect, in these gas monitoring devices described above, a second display unit is further included that displays a suppression part for which it is determined by the alarm activation suppression determination unit that the alarm activation is suppressed in the image.

Since such a gas monitoring device includes the second display unit, it is possible to refer to the current alarm activation suppression part in the image.

In another aspect, in these gas monitoring devices described above, the alarm activation suppression determination unit determines whether or not to activate an alarm of the presence of gas detected by the gas detection unit, by using a machine learning model that determines whether or not to suppress the alarm activation of the presence of gas detected by the gas detection unit, the machine learning model being subjected to machine learning on the basis of the additional information received by the input unit, for a predetermined period.

Such a gas monitoring device can determine whether or not to suppress the alarm activation of the presence of gas detected by the gas detection unit by using the machine learning model.

A gas monitoring method according to another aspect of the present invention is a method for monitoring presence or absence of gas in a monitoring target and activating an alarm of presence of gas when the presence of gas is detected, and the method includes: a gas detection step of detecting presence or absence of a predetermined gas on the basis of an image obtained by imaging the monitoring target; an input step of receiving an input of predetermined additional information including alarm activation presence/absence information representing whether or not to activate an alarm; and an alarm activation suppression determination step of determining whether or not to suppress alarm activation of the presence of gas detected in the gas detection step on the basis of the additional information received in the input step. A gas monitoring program according to another aspect of the present invention is a program for monitoring presence or absence of gas in a monitoring target and activating an alarm of presence of gas in a case where the presence of gas is detected, the program causing a computer to function as: a gas detection unit that detects presence or absence of a predetermined gas on the basis of an image obtained by imaging the monitoring target; an input unit that receives an input of predetermined additional information including alarm activation presence/absence information representing whether or not to activate an alarm; and an alarm activation suppression determination unit that determines whether or not to suppress alarm activation of the presence of gas detected by the gas detection unit on the basis of the additional information received by the input unit.

Such a gas monitoring method and gas monitoring program receive an input of predetermined additional information including alarm activation presence/absence information representing whether or not to activate an alarm, and determine whether or not to suppress the alarm activation of the presence of gas on the basis of the received additional information. For this reason, the gas monitoring method and the gas monitoring program receive an input of an observer (user, operator) in consideration of, for example, a cause of detection, continuity of subsequent alarm activation, and the like, thereby being able to reduce the alarm activation determined to be unnecessary while using the gas monitoring method and the gas monitoring program, and thus, false alarms can be reduced.

This application is based on Japanese Patent Application No. 2019-108534 filed on Jun. 11, 2019, the contents of which are included in the present application.

The embodiments of the present invention have been illustrated and described in detail; however, it is to be understood that they are merely an illustrative example and an actual example, and not restrictive. The scope of the present invention should be interpreted by the wording of the appended claims.

To express the present invention, the present invention has been appropriately and sufficiently described above through the embodiments with reference to the drawings, but it should be recognized that a person skilled in the art can easily change and/or improve the above-described embodiments. Thus, unless a change or improvement performed by a person skilled in the art is at a level that departs from the scope of the claims described in claims, the change or improvement is interpreted to be included in the scope of the claims.

INDUSTRIAL APPLICABILITY

According to the present invention, it is possible to provide a gas monitoring device, a gas monitoring method, and a gas monitoring program that monitor the presence or absence of a predetermined gas in a space.

The invention claimed is:

1. A gas monitoring device comprising:
a gas detector that detects presence or absence of a predetermined gas based on an image obtained by imaging a monitoring target; and
a hardware processor that:
receives, in response to detection of presence of gas by the gas detector, an input of predetermined additional information including (i) alarm activation presence/absence information representing whether or not to activate an alarm, and (ii) cause information representing a cause of the detection of the presence of gas by the gas detector; and
determines, based on the received additional information, whether or not to suppress activation of an alarm to be activated in response to the detection of the presence of gas by the gas detector.

2. The gas monitoring device according to claim 1, wherein the hardware processor stores, as detection information, a detection part in which the presence of gas is detected by the gas detector in the image, in association with the received additional information.

3. The gas monitoring device according to claim 2, wherein:
the gas detector detects presence or absence of gas for each of pixels of the image, and
the detection part is a pixel at a centroid position of a gas area formed by combining a plurality of pixels at positions adjacent to each other with presence of gas into one.

4. The gas monitoring device according to claim 2, wherein the hardware processor suppresses alarm activation with respect to a pixel within a predetermined distance from the detection part when determining to suppress activation of the alarm.

5. The gas monitoring device according to claim 2, wherein the hardware processor collectively receives an input of the additional information in a predetermined period.

6. The gas monitoring device according to claim 2, wherein the hardware processor determines whether or not to suppress activation of the alarm based on an aggregation result obtained by aggregation in a predetermined aggregation unit of a number of times of detection in which the presence of gas is detected by the gas detector based on a plurality of images captured at a plurality of different times in a predetermined period.

7. The gas monitoring device according to claim 2, wherein the hardware processor suppresses activation of the alarm for a predetermined period from a time point at which it is determined to suppress activation of the alarm.

8. The gas monitoring device according to claim 1, wherein the hardware processor collectively receives an input of the additional information in a predetermined period.

9. The gas monitoring device according to claim 1, wherein the hardware processor determines whether or not to suppress activation of the alarm based on an aggregation result obtained by aggregation of a number of times of detection in which the presence of gas is detected by the gas detector based on a plurality of images captured at a plurality of different times in a predetermined period.

10. The gas monitoring device according to claim 1, wherein the hardware processor suppresses activation of the alarm for a predetermined period from a time point at which it is determined to suppress activation of the alarm.

11. The gas monitoring device according to claim 10, wherein the hardware processor determines a length of the predetermined period, based on an aggregation result obtained by aggregating alarm activation presence/absence information representing that no alarm is to be activated, for each of the detection part and the additional information, for a predetermined period.

12. The gas monitoring device according to claim 1, wherein the hardware processor displays detection information received and stored in the past.

13. The gas monitoring device according to claim 1, further comprising a display that displays a suppression part in the image with respect to which it is determined by the hardware processor that activation of the alarm is to be suppressed.

14. The gas monitoring device according to claim 1, wherein the hardware processor determines whether or not to activate the alarm in response to detection of the presence of gas by the gas detector, by using a machine learning model that determines whether or not to suppress activation of the alarm to be activated in response to the detection of the presence of gas by the gas detector, the machine learning model being subjected to machine learning based on the received additional information, for a predetermined period.

15. The gas monitoring device according to claim 1, wherein the hardware processor controls to display, on a display in response to the detection of the presence of gas by the gas detector, an additional information input screen through which the input of the additional information is performed.

16. The gas monitoring device according to claim 15, wherein the additional information input screen includes a gas detection image display area in which the image is displayed, and an additional information input area adapted to receive the input of the additional information.

17. A gas monitoring method comprising:
   detecting presence or absence of a predetermined gas based on an image obtained by imaging a monitoring target;
   in response to detection of presence of gas in the detecting, receiving an input of predetermined additional information including (i) alarm activation presence/absence information representing whether or not to activate an alarm, and (ii) cause information representing a cause of the detection of the presence of gas; and
   determining, based on the received additional information, whether or not to suppress activation of an alarm to be activated in response to the detection of the presence of gas in the detecting.

18. A non-transitory recording medium storing a computer readable gas monitoring program that is executable by a computer to cause the computer to function as elements comprising:
   a gas detector that detects presence or absence of a predetermined gas based on an image obtained by imaging a monitoring target; and
   a hardware processor that:
      receives, in response to detection of presence of gas by the gas detector, an input of predetermined additional information including (i) alarm activation presence/absence information representing whether or not to activate an alarm, and (ii) cause information representing a cause of the detection of the presence of gas by the gas detector;
      determines, based on the received additional information, whether or not to suppress alarm activation of an alarm to be activated in response to the detection of the presence of gas by the gas detector.

* * * * *